(12) United States Patent
Merg et al.

(10) Patent No.: US 10,068,207 B2
(45) Date of Patent: Sep. 4, 2018

(54) SYSTEMS AND METHODS TO GENERATE REPAIR ORDERS USING A TAXONOMY AND AN ONTOLOGY

(71) Applicant: Snap-on Incorporated, Kenosha, WI (US)

(72) Inventors: Patrick S. Merg, Hollister, CA (US); Jacob G. Foreman, San Jose, CA (US); Bradley R. Lewis, Gilroy, CA (US); Brett Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 69 days.

(21) Appl. No.: 15/185,863

(22) Filed: Jun. 17, 2016

(65) Prior Publication Data
US 2017/0364870 A1 Dec. 21, 2017

(51) Int. Cl.
*G06Q 10/00* (2012.01)
(52) U.S. Cl.
CPC .................. *G06Q 10/20* (2013.01)
(58) Field of Classification Search
CPC ...................................................... G06Q 10/20
See application file for complete search history.

(56) References Cited

U.S. PATENT DOCUMENTS

| | | | | |
|---|---|---|---|---|
| 6,151,604 A * | 11/2000 | Wlaschin | .......... | G06F 17/30315 707/741 |
| 6,163,775 A * | 12/2000 | Wlaschin | .......... | G06F 17/30315 |
| 6,285,932 B1 * | 9/2001 | de Bellefeuille | ...... | G07C 5/008 701/2 |
| 6,560,516 B1 * | 5/2003 | Baird | ..................... | G07C 5/008 701/23 |
| 6,768,935 B1 * | 7/2004 | Morgan | ................. | G06Q 10/10 701/29.6 |
| 7,142,960 B2 * | 11/2006 | Grier | .................. | G05B 23/0248 701/29.1 |

(Continued)

OTHER PUBLICATIONS

Catherine Roussey, Francois Pinet, Myoung Ah Kang, and Oscar Corcho, Ontologies in Urban Development Projects, Chapter 2, all pages, published in 2011, retrieved from http://oa.upm.es/10381/1/An_Introduction.pdf.*

(Continued)

*Primary Examiner* — Calvin Cheung
(74) *Attorney, Agent, or Firm* — McDonnell Boehnen Hulbert & Berghoff LLP

(57) ABSTRACT

Methods and apparatus are provided that are related to generating repair orders, including vehicular repair orders. A computing device can receive repair-related information associated with a repair order. The repair-related information can include information about a first repair attribute of one or more repair attributes. The computing device can determine a first ontology related to the first repair attribute. The first ontology can be further related to a first template. The computing device can determine modified repair-related information by at least utilizing the first template to modify at least a first portion of the repair-related information that includes the information about the first repair attribute. The computing device can generate an output related to the repair order that includes the modified repair-related information.

22 Claims, 18 Drawing Sheets

(56) References Cited

U.S. PATENT DOCUMENTS

| | | | | |
|---|---|---|---|---|
| 7,209,815 | B2* | 4/2007 | Grier | G07C 5/0825 340/438 |
| 8,423,226 | B2* | 4/2013 | Underdal | G06N 7/005 701/31.4 |
| 8,428,813 | B2* | 4/2013 | Gilbert | G06N 5/04 701/31.4 |
| 8,489,601 | B2* | 7/2013 | Rajpathak | G06Q 10/20 707/736 |
| 8,648,700 | B2* | 2/2014 | Gilbert | B60R 16/0234 340/425.5 |
| 2003/0110055 | A1* | 6/2003 | Chau | G06F 17/30595 705/29 |
| 2007/0233641 | A1* | 10/2007 | Chong | G06F 17/30407 |
| 2007/0288419 | A1* | 12/2007 | Strassner | G06N 5/02 706/55 |
| 2008/0208814 | A1* | 8/2008 | Friedlander | G06F 17/30533 |
| 2009/0144306 | A1* | 6/2009 | Min | G06Q 30/02 |
| 2012/0185399 | A1* | 7/2012 | Draper | G06Q 30/014 705/303 |
| 2014/0136187 | A1* | 5/2014 | Wolverton | G06F 17/30654 704/9 |
| 2014/0258304 | A1* | 9/2014 | Sabanski | G06F 17/30994 707/740 |
| 2015/0088896 | A1* | 3/2015 | Gehrking | G06F 17/30707 707/739 |
| 2015/0324363 | A1 | 11/2015 | Merg | |
| 2016/0148096 | A1* | 5/2016 | Bornea | G06F 17/277 706/55 |

OTHER PUBLICATIONS

Gruber, "Ontology", all pages, 2008, retrieved from http://web.dfc.unibo.it/buzzetti/IUcorso2007-08/mdidattici/ontology-definition-2007.htm.*

Paolo Umiliacchi, David Lane, and Felice Romano, "Predictive maintenance of railway subsystems using an Ontology based modelling approach", dated 2011, all pages, https://osl.eps.hw.ac.uk/files/uploads/publications/WCRR2011%20Paper%20final%20v05.pdf.*

"OWL Web Ontology Language Semantics and Abstract Syntax", dated Feb. 10, 2004, all pages, retreived from http://www.w3.org/TR/owl-semantics/.*

International Searching Authority, International Search Report and Written Opinion of the International Searching Authority for PCT Pat. App. No. PCT/US2017/037795, dated Sep. 14, 2017.

G. Press, "Cleaning Big Data: Most Time-Consuming, Least Enjoyable Data Science Task, Survey Says", Mar. 23, 2016, available via the internet at www.forbes.com/sites/gilpress/2016/03/23/data-preparation-most-time-consuming-eastenjoyable-data-science-task-survey-says/#687a79e36f63 (last visited Apr. 13, 2018).

* cited by examiner

Ontology 140a

Sentence Template 270
 Symptom → Description → Spatial → System → Condition → Speed

Sentence Template 272
 Spatial → System → Description → Symptom → Condition → Speed

Repair Order Template 274
 Vehicle Info → Cause → Parts and Labor

Repair Order Template 276
 Vehicle Info → Cause → Diagnosis → Parts and Labor → Commonly Replaced Parts Graph → Additional Related Parts

Ontology 140b

| Attr. Group 280 | Attribute 282 |
|---|---|
| Fluid | Coolant |
| Fluid | Fuel |
| Freq. | Intermittent |
| Speed | High Speed |
| Speed | Low Speed |
| Spatial | Front |
| Spatial | Inside |
| Spatial | Left |
| System | Air Conditioning |
| System | Brakes |
| System | Door Lock |
| System | Window |
| Condition | Accelerating |
| Condition | Over Bumps |
| Condition | Hot |
| Condition | Stopping |

FIG. 2D

Computing Device 100

| Repair Order 500 ||
|---|---|
| Vehicle Information 510 | Diagnosis 512 |
| Year: 2002<br>Make: Honda<br>Model: Civic<br>Sub-model: DX<br>Engine: 1.7L | Complaint: The customer states the engine idles rough with A/C on.<br><br>Repair: Air control valve was checked and replaced. |
| Parts and Labor 514 ||
| Component: Idle Air Control Valve<br>    Part #: 18011-P7C-IACV7        Price: $98.76<br>Labor: 1.0 hr.                                 Price: $95.00<br><br>                                                 Total $193.76 ||

FIG. 5A

Computing Device 100

| Repair Order 500a | |
|---|---|
| Vehicle Information 510a<br>Year: 2001<br>Make: Honda<br>Model: Accord<br>Sub-model: EX<br>Engine: 3.0L | Diagnosis 512a<br>Complaint: The customer states the check engine light is on.<br><br>Cause: Connected a scan tool and found code P0401 – Exhaust Gas Recirculation "A" Flow Insufficient Detected. Used the scan tool to command the exhaust gas recirculation valve (EGRV) open to 100%, observed the valve position parameters on the scan tool, and found the actual valve position parameter remained at 0%. |
| Parts and Labor 514a<br>Component:<br>Exhaust Gas Recirculation Valve<br>Part #: 18011-P8A-AD0<br>Price: 236.28<br>Labor: 1.25 hr.<br>Price: 115.00<br><br>Total: $326.28 | |

Commonly Replaced Parts Graph (CRP Graph) 516

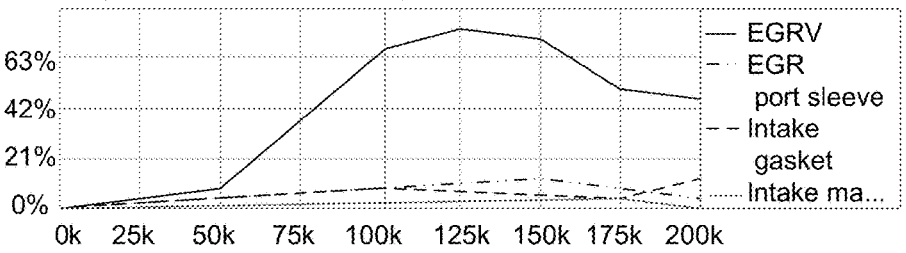

— EGRV
–·– EGR port sleeve
– – Intake gasket
······ Intake ma...

Additional Replaced Parts Graph (ARP Graph) 518

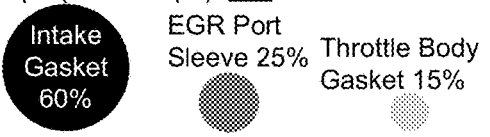

Intake Gasket 60%   EGR Port Sleeve 25%   Throttle Body Gasket 15%

FIG. 5C

SYSTEMS AND METHODS TO GENERATE REPAIR ORDERS USING A TAXONOMY AND AN ONTOLOGY

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to generate repair orders, diagnose vehicles, and/or repair vehicles. Those tools may include computers configured for data entry, common hand tools, such as wrenches, hammers, pliers, screwdrivers and socket sets, or more vehicle-specific tools, such as cylinder hones, piston-ring compressors, and vehicle brake tools. The tools used by vehicle technicians may also include electronic tools such as a vehicle scan tool or a digital voltage-ohm meter (DVOM), for use diagnosing and/or repairing a vehicle.

SUMMARY

In one aspect, a method is provided. A computing device receives repair-related information associated with a repair order. The repair-related information includes information about a first repair attribute of one or more repair attributes. The computing device determines a first ontology related to the first repair attribute, where the first ontology is further related to a first template. The computing device determines modified repair-related information by at least utilizing the first template to modify at least a first portion of the repair-related information including the information about the first repair attribute. The computing device generates an output related to the repair order including the modified repair-related information.

In another aspect, a computing device is provided. The computing device includes one or more processors; and a non-transitory computer-readable medium. The non-transitory computer-readable medium is configured to store at least computer-readable instructions that, when executed by the one or more processors, cause the computing device to perform functions. The functions include: receiving repair-related information associated with a repair order, where the repair-related information includes information about a first repair attribute of one or more repair attributes; determining a first ontology related to the first repair attribute, where the first ontology is further related to a first template; determining modified repair-related information by at least utilizing the first template to modify at least a first portion of the repair-related information including the information about the first repair attribute; and generating an output related to the repair order including the modified repair-related information.

In another aspect, a non-transitory computer-readable medium is provided. The non-transitory computer-readable medium is configured to store at least computer-readable instructions that, when executed by one or more processors of a computing device, cause the computing device to perform functions. The functions include: receiving repair-related information associated with a repair order, where the repair-related information includes information about a first repair attribute of one or more repair attributes; determining a first ontology related to the first repair attribute, where the first ontology is further related to a first template; determining modified repair-related information by at least utilizing the first template to modify at least a first portion of the repair-related information including the information about the first repair attribute; and generating an output related to the repair order including the modified repair-related information.

In another aspect, a device is provided. The device includes: means for receiving repair-related information associated with a repair order, where the repair-related information includes information about a first repair attribute of one or more repair attributes; means for determining a first ontology related to the first repair attribute, where the first ontology is further related to a first template; means for determining modified repair-related information by at least utilizing the first template to modify at least a first portion of the repair-related information including the information about the first repair attribute; and means for generating an output related to the repair order including the modified repair-related information.

BRIEF DESCRIPTION OF THE DRAWINGS

FIGS. 2C and 2D depict example ontologies, in accordance with an embodiment.

FIG. 5A depicts an example view of a user interface of a computing device used for displaying a repair order, in accordance with an embodiment.

FIG. 5C depicts an example view of another user interface of a computing device used for displaying a repair order, in accordance with an embodiment.

DETAILED DESCRIPTION

Introduction

Figure 1A:
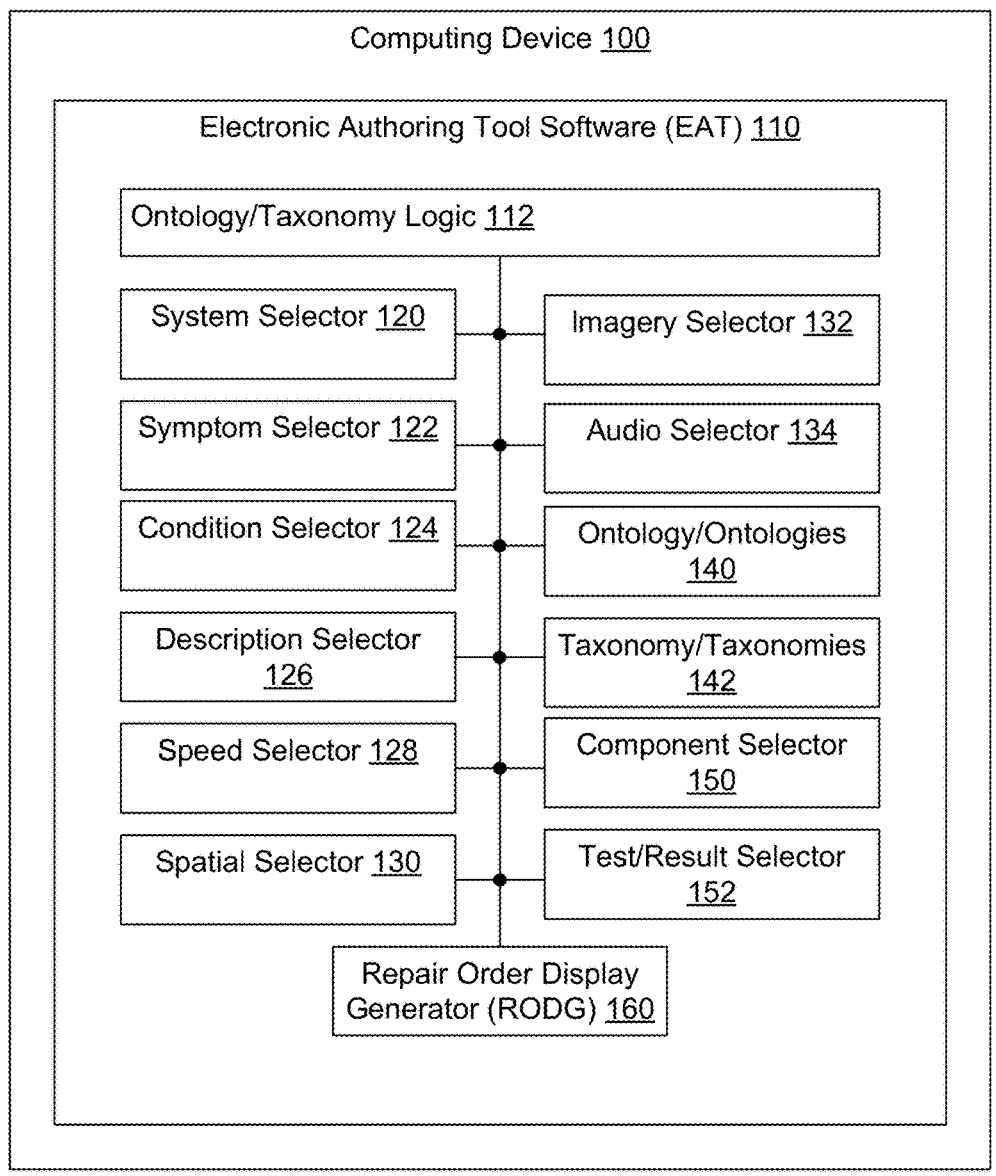
FIG. 1A is a block diagram of an example computing device, in accordance with an embodiment.

Herein are disclosed methods and apparatus related to generation of repair orders, such as repair orders for vehicles, where the vehicles can include automobiles, trucks, boats, airplanes, and other motor vehicles. Personnel who enter repair orders may not be proficient entering in data related to repair orders and/or may not have sufficient time to enter repair orders that accurately represent customer complaints, conditions, symptoms and requests, particularly if such data is provided orally. To address these concerns, the herein-described techniques can provide structured procedures to describe complaints, conditions, symptoms, and requests using software utilizing repair-order related ontologies and taxonomies. Using the herein-described techniques, repair order entry and generation can be sped up, the workload on a person entering repair orders decreased, and the accuracy of data on the repair order can be increased. By generating repair order data using common formats and terminology, data mining and related systems operating on the repair order data can be improved. Such data mining systems can spend less time pre-preprocessing the repair order data (such as interpreting and converting repair order terminology) and can generate more accurate results, since these systems are operating on more consistent data.

The herein-described techniques can enable generation of repair orders. For example, a computing device can receive repair-related information associated with a vehicular repair order. This repair-related information can include information complaints, conditions, symptoms, and requests provided by a customer (or customers) related to a repair, such as a vehicular repair. In particular, the repair-related information can include one or more repair "attributes", or terms and/or phrases related to a repair. Such repair attributes can include, but are not limited to, attributes of the repair including attributes related to: one or more symptoms, one or more occurrences of symptoms or complaints, one or more locations and/or spaces, one or more systems of a vehicle (or other object to be repaired), one or more speeds, one or more descriptions, audio, imagery, and/or conditions. The repair attributes can include vehicular-repair attributes associated with a vehicular repair order.

The computing device can determine one or more ontologies related to the repair attributes. As described herein, an ontology can specify and/or describe one or more relationships between attributes. In some cases, the ontology can include one or more templates that specify and/or describe relationships of attributes. A template can include predetermined and/or variable attributes. A predetermined attribute can be an attribute unchanged by use of the template, and can be expressed in a template as a fixed string and/or other constant value(s), such as "idles", "idles fast", "40 MPH" (miles per hour), etc. A variable attribute can represent an attribute whose value can change by use of the template, and can be expressed in a template as a "tag" or placeholder for a fixed value of the attribute; e.g., a "<component>" tag for a component attribute in the template.

Generally, a taxonomy can be, include, and/or refer to one or more datasets (e.g., one or more databases, objects, listings, registries) storing information specifying and/or describing one or more attributes, where attributes can include words, terms, phrases, images, sounds, etc. And, generally an ontology can be, include, and/or refer to one or more datasets storing information about concepts related to a topic, such as vehicular repair, that can be specified in terms of one or more attributes; that is, an ontology can relate concepts about the topic specified based on attributes that can be found in one or more taxonomies. As an analogy to the taxonomies and ontologies discussed in more detail herein, an English language dictionary can serve, at least in part, as a taxonomy for a portion of the English language whose words (attributes) are specified in the dictionary, while an English language grammar book can serve, at least in part, as an ontology relating attributes related to a topic; e.g., parts of speech in the English language. In some embodiments, a taxonomy can include attributes related to multiple aspects; e.g., one taxonomy can include description-related attributes, condition-related attributes, speed-related attributes, and/or other attributes.

The computing device can modify repair-related information using the template and/or other features of the ontology. For example, repair-related information can be modified by adding, removing, reordering, and/or changing one or more attributes in the repair-related information. Further, the ontology can be used to organize entry of the repair-related information.

Continuing the above-mentioned example, supposed a misspelled term "engin" is entered to specify a vehicular-repair-related customer complaint using a computing device, where the computing device can access an ontology that includes the above-mentioned template T and one or more related taxonomies. Then, the computing device can use the ontology and/or the related taxonomies to determine that the term "engin" is a misspelled word related to the attribute "engine", and then change the misspelled term "engin" to become "engine". Then, if the phrase "fast idle" is entered to further specify the customer complaint, the computing device can access an ontology, and perhaps one or more related taxonomies, to determine a preferred term "idles fast" and reorder and modify the entered phrase "fast idle" to be the preferred term "idles fast". Additionally, the computing device can apply the terms "engine" and "idles fast" to the ontology to determine the above-mentioned template T to specify the customer complaint.

Further, a template and/or other aspects of the ontology and related taxonomies can be used to control a user interface for entering repair-related information. In one aspect, the user interface can be configured to accept one or more selections associated with the one or more vehicular-repair attributes. Continuing the example above, the computing device can use the template T to instruct the user interface to prompt for the description, condition, and/or speed attributes specified in template T. If these attributes are entered out of the description/condition/speed order specified by template T; e.g., the speed can be specified before the description, the computing device can use the order specified by template T to reorganize the entered repair-related information to specify the customer complaint as ordered by template T. For example, if the entered repair-related information include the following terms "at high speed", "intermittent", and "accellertin", the computing device can use template T and any related ontologies and taxonomies to modify the entered repair-related information to be "The engine intermittently idles fast while accelerating at high speed".

In another example, a customer can try to describe a sound made by a vehicle to be repaired. Then, the computing device can play an audio file (or other representation of audio information) to the customer, where the audio information is associated with one or more attributes. For example, an audio file recording the sound of squeaky brakes can be associated with attributes such as "squeak" and/or "squeaky brakes" and another audio file recording the sound of grinding brakes can be associated with attributes such as "grind" and/or "grinding brakes". When the customer agrees that the audio file replays a sound of the vehicle associated with the customer's complaint, then the computing device can update the customer's complaint and/or other repair-related information with information related to the one or more attributes associated with the audio file (e.g., the attribute "squeaky brakes", an attribute-related sentence "Customer hears a squeak."). Further, the repair-related information can be modified to include (related) audio, such as the audio file identified by the customer, and/or (related) imagery information, such as images of a brake system, an image of the vehicle under repair, and/or video of brake pads being installed.

After modifying the repair-related information, the computing device can generate an output related to a (vehicular) repair order including the modified repair-related information. In some cases, the repair order can be specified by templates and/or the ontology. For example, one template can specify that a repair order include a description of the customer complaint, a diagnosis of the customer complaint, and a listing of parts and labor used to address the complaint. Another template can specify that a repair order include a description of the customer's complaint, a diagnosis of the customer complaint, a listing of parts and labor used to address the complaint, a graph of commonly repaired parts, and an indication of additional related parts, perhaps with a photo of the repaired vehicle. Many other repair orders and/or repair order templates are possible as well.

Electronic Authoring Tool Software with Related Ontologies and Taxonomies

FIG. 1A is a block diagram of computing device 100, in accordance with an embodiment. Computing device 100 includes electronic authoring tool software (EAT) 110, which can provide one or more user interfaces related to vehicular repair, such as graphical user interfaces and/or other user interfaces discussed below. For example, electronic authoring tool software 110 can be used to receive, modify, and output repair-related information; e.g., repair-related information related to vehicular repairs and repair orders. The repair-related information can include inputs such as entered complaint information regarding a customer complaint that lead to a vehicular repair, cause information about one or more reasons for the customer complaint and perhaps other reasons for repairs, vehicular information about a vehicle to be repaired, information (e.g., parts and labor information) about repairs made to the vehicle to address the customer complaint (and perhaps for other reasons), and information about other vehicles that were similarly repaired.

For example, if a customer complains that the front brakes of a 2008 Honda Civic are squeaky, electronic authoring tool software 110 can be used to enter and perhaps modify the complaint and vehicular information. In this example, the complaint information could be "Front brakes squeak" and the vehicular information could provide descriptive information about a vehicle-under-repair; e.g., year of manufacture, manufacturer name, model name, owner name(s), vehicle information number (VIN), license plate number information, engine size and/or other identification information, and/or other information about the vehicle-under-repair. Modifications to entered information performed by electronic authoring tool software 110 (or components thereof) can include, but are not limited to, correction of misspellings in entered information, replacement of entered information by preferred terminology related to the entered information, reordering of entered information, addition of more information (e.g., one or more words, images, sounds) to entered information, presentation of prompts intended to invoke additional entered information, and perhaps other changes to entered information.

Then, the personnel performing the repair notice both that the front brakes need servicing and further that the rear brakes require servicing, and so reasons for repairs could be entered and/or modified using electronic authoring tool software 110, where the reasons for repairs can include reasons for repairing both the front and rear brakes of the vehicle. Electronic authoring tool software 110 can also be used to enter and/or modify information about parts, labor, related costs and/or other items (e.g., environmental fees, taxes, additional/auxiliary parts used, name(s) of personnel performing the repair) for the repair.

Upon completion of the repair, any non-entered data about the repair can be entered (and perhaps modified) using electronic authoring tool software 110. Electronic authoring tool software 110 can be used to generate one or more repair orders related to the completed repair. The repair order(s) can include some or all of the entered and/or modified information, as well as additional information including, but not limited to, information about commonly replaced parts and/or commonly performed labor codes for the same or similar repairs, additional replaced parts and/or additionally performed labor codes for the same or similar repairs, and images and/or sounds related to the performed repair. Once generated, electronic authoring tool software 110 can output and/or save the generated repair order(s) as one or more displays, printouts, electronic communications, and/or electronic documents (e.g., e-mails, files, text messages with embedded links). In other examples, electronic authoring tool software 110 can perform more, fewer, and/or different functions related receiving, modifying, and/or outputting repair-related information.

FIG. 1A shows that electronic authoring tool software 110 can include ontology/taxonomy logic 112, system selector 120, symptom selector 122, condition selector 124, description selector 126, speed selector 128, spatial selector 130, imagery selector 132, audio selector 134, ontology/ontologies 140, taxonomy/taxonomies 142, component selector 150, test result selector 152, and repair order display generator (RODG) 160. In other embodiments, computing device 100 and/or electronic authoring tool software 110 can include more, fewer, and/or different components than shown in FIG. 1A. Electronic authoring tool software 110 can coordinate activities performed by components of electronic authoring tool software 110; e.g., ontology/taxonomy logic 112, selectors 120, 122, 124, 126, 128, 130, 132, 134, 150, 152, ontology/ontologies 140, taxonomy/taxonomies 142, and repair order display generator 160.

Electronic authoring tool software 110 can include ontology/taxonomy logic 112 to process entered information and perhaps other information using one or more ontologies 140 and/or one or more taxonomies 142. Selectors of electronic authoring tool software 110 can be used to select data, such as attributes and/or templates, from one or more ontologies 140 and/or one or more taxonomies 142. For example, respective system selector 120, symptom selector 122, condition selector 124, description selector 126, speed selector 128, spatial selector 130, imagery selector 132, audio selector 134, component selector 150, and test result selector 152, can select data from one or more ontologies 140 and/or one or more taxonomies 142 related to respective systems, symptoms, conditions, descriptions, speeds, spaces and/or descriptions of spaces, images, audio, components, and test results.

A selector can select attributes and/or templates, from one or more ontologies 140 and/or one or more taxonomies 142 using one or more selection techniques. A first selection technique involves a selector provided with an input SEL_IN that includes a string of characters, and the selector can search one or more ontologies 140 and/or one or more taxonomies 142 to determine if the string represented by SEL_IN is found in one or more templates and/or one or more attributes. In some embodiments, the selector can receive additional inputs requesting particular information to be provided based on the contents of SEL_IN. The additional inputs can be used to request information based on the contents of SEL_IN including, but not limited to associated attributes, attribute groups, templates, text, audio, static/still imagery, and moving/video imagery. For example, SEL_IN can include the word "squeal" and additional inputs can request information about attributes associated with SEL_IN. In response, the first selection technique can determine and provide information about a noise descriptor attribute and a symptom audio attribute related to SEL_IN. Then, the first selection technique can receive an additional request related to the same SEL_IN with an additional input requesting audio related to SEL_IN. In response, the first selection technique can determine and provide audio information, such as an audio file or reference thereof, related to the symptom audio attribute for "squeak".

A second selection technique is to compare SEL_IN with one or more attributes to determine if SEL_IN is a properly spelled word (or words) or is a misspelled word (or words). In some embodiments, at least the second selection technique can, in addition comparing SEL_IN to one or more attributes, also search a dictionary to determine if a word (or words) in SEL_IN are spelled correctly and/or apply stemming rules to determine if a word (or words) in SEL_IN are properly spelled and/or utilize proper suffixes. A third selection technique is to apply one or more grammatical and/or syntactic rules to determine if SEL_IN is properly expressed grammatically and syntactically or is improperly expressed grammatically and/or syntactically. A fourth selection technique is to compare one or more words in SEL_IN to one or more preferred terms stored in one or more ontologies 140 and/or one or more taxonomies 142 to determine if the one or more words in SEL_IN include preferred terms, non-preferred terms, and/or terms that are neither preferred or non-preferred (e.g., terms not related to attributes and/or templates in one or more ontologies 140 and/or one or more taxonomies 142).

A fifth selection technique is to apply one or more other selection techniques to determine differences in SEL_IN with respect to a canonical searching representation; that is, a standard representation of words usable for searching for attributes and/or templates, update SEL_IN to resolve the differences between SEL_IN and the canonical searching representation, and subsequently search for the updated SEL_IN in one or more ontologies 140 and/or one or more taxonomies 142 in an attempt to find one or more attributes and/or templates. The one or more other selection techniques can be used to determine differences from the canonical searching representation, such as determining misspelled word(s) in SEL_IN, improperly expressed grammatically and/or syntactically word(s) in SEL_IN, and/or non-preferred word(s) in SEL_IN. Then SEL_IN can be updated to fit the canonical searching representation; e.g., any misspelled words in SEL_IN can be correctly spelled, improperly expressed wording in SEL_IN can be properly expressed, and non-preferred terms in SEL_IN can be replaced with preferred terms.

The updates to SEL_IN can be based on user input and/or programmatically performed based on one or more canonical-searching-representation rules to update SEL_IN to fit the canonical searching representation. These canonical-searching-representation rules can include, but are not limited to, rules for:

invoking other selection techniques to update SEL_IN, which can include specifying an ordering of invocation of the other selection techniques (e.g., use the second selection technique before using the first selection technique), reorganizing words in SEL_IN to be in a canonical order; e.g., nouns before verbs, removing words in SEL_IN unlikely to improve the search (e.g., words such as "a", "an", "the"), replacing numeric terms with corresponding numbers (e.g., replace "nine" with "9"), and updating SEL_IN on a character-by-character basis to improve searching (e.g., convert all characters to upper or lower case, remove excess spaces and/or tabs).

After SEL_IN is updated, the fifth selecting technique can search one or more ontologies 140 and/or one or more taxonomies 142 in an attempt to find one or more attributes and/or templates using the updated SEL_IN; for example, the fifth selecting technique can be provided the updated SEL_IN to the first selecting technique to search for attributes and/or templates. Other selection techniques for use by selector(s) and other examples related to the herein-described selection techniques are possible as well.

Repair order display generator 160 can be used to generate one or more repair orders that can describe one or more vehicular repairs. Once generated, repair orders can be output and/or saved by computing device 100, electronic authoring tool software 110, and/or repair order display generator 160 as one or more displays, printouts, electronic communications, and/or electronic documents.

Figure 1B:
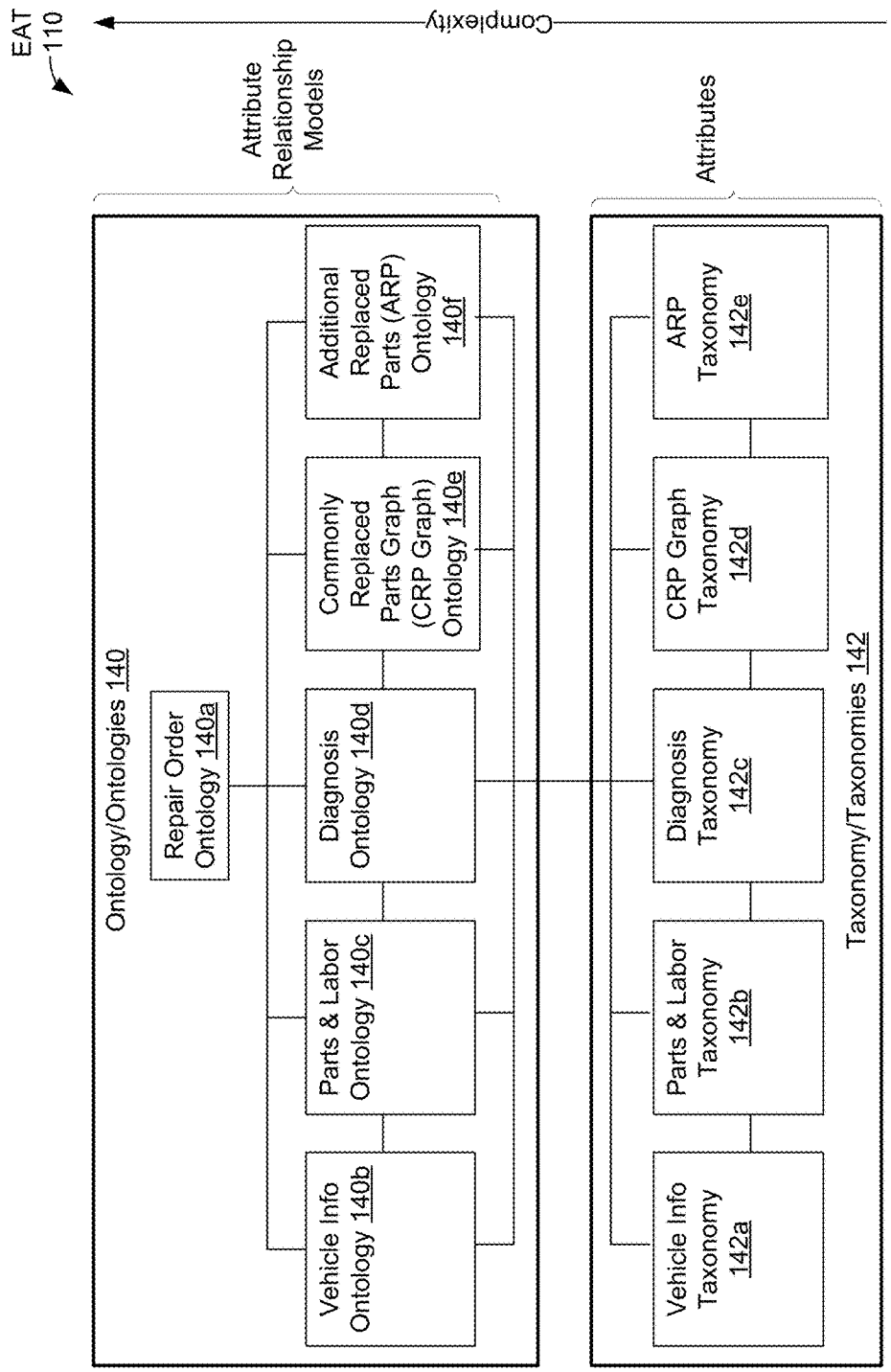
FIG. 1B is a block diagram showing relationships between ontologies and taxonomies, in accordance with an embodiment.

FIG. 1B is a block diagram showing relationships between one or more ontologies 140 and one or more taxonomies 142, in accordance with an embodiment. Generally speaking, taxonomies can include information about single attributes and ontologies can include information about concepts specified using one or more attributes. That is, ontologies can include information describing multi-attribute concepts and relationships that can be more complex than the single-attribute concepts that can be described using taxonomies.

In the example shown in FIG. 1B, one or more ontologies 140 include repair order ontology 140a, vehicle information ontology 140b, parts and labor ontology 140c, diagnosis ontology 140d, commonly replaced parts (CRP) graph ontology 140e, and additional replaced parts (ARP) ontology 140f. Repair order ontology 140a can relate concepts related to repair orders, such as vehicle information-related concepts related using vehicle information ontology 140b, parts and labor-related concepts related using parts and labor ontology 140c, diagnosis-related concepts related using diagnosis ontology 140d, commonly related parts-related concepts related using commonly replaced parts graph ontology 140e, additionally replaced parts-related concepts related using additional replaced parts (ARP) ontology 140f, and perhaps other concepts; e.g., graph-related concepts, audio-related concepts, other concepts related to repair orders.

In the example shown in FIG. 1B, one or more taxonomies 142 include vehicle information taxonomy 142a, parts and labor taxonomy 142b, diagnosis taxonomy 142c, commonly replaced parts taxonomy 142d, and additional replaced parts taxonomy 142e. For this example, vehicle information ontology 140b can specify vehicle information-related concepts using attributes specified by vehicle information taxonomy 142a, parts and labor ontology 140c can specify parts and labor-related concepts using attributes specified by parts and labor taxonomy 142b, diagnosis ontology 140d can specify diagnosis-related concepts using attributes specified by parts and labor taxonomy 142c, commonly replaced parts ontology 140e can specify commonly replaced parts-related concepts using attributes specified by commonly replaced parts taxonomy 142d, and additional replaced parts ontology 140f can specify additional replaced parts-related concepts using attributes specified by additional replaced parts taxonomy 142e.

In other examples, the one or more ontologies 140 can include more, fewer, and/or different ontologies than shown in FIG. 1B and/or one or more taxonomies 142 can include more, fewer, and/or different taxonomies than shown in FIG. 1B. In still other examples, one-to-one mappings between ontologies 140 and taxonomies 142 are not used; e.g., ontologies 140 can include one ontology, such as repair order ontology 140a while multiple taxonomies are used in taxonomies 142, multiple ontologies can be used as ontologies 140 while one taxonomy; e.g., a common repair-related taxonomy specifying all repair-related attributes used by ontology/taxonomy logic 112, can be used, or multiple ontologies and multiple taxonomies can be used that do not have one to one mappings; e.g., the taxonomies shown in FIG. 1B can be replaced by a components taxonomy, a labor-related taxonomy, and an "other attributes" taxonomy. Many other examples are possible as well.

As an example use case, ontology/taxonomy logic 112 can receive an entered term, such as "engin" and provide the term to ontology/taxonomy logic 112. Ontology/taxonomy logic 112 can receive the term "engin" and select an ontology from among one or more ontologies 140 and/or select a taxonomy from among one or more taxonomies 142 related to the entered term "engin". In some embodiments, ontology/taxonomy logic 112 can use one or more selectors, such as system selector 120 and/or component selector 150, to select one or more taxonomies that can include entered term "engin", such as one or more taxonomies related to vehicular systems and/or components.

Upon selection of ontologies and/or taxonomies related to the entered term, ontology/taxonomy logic 112 can process and perhaps modify the entered term using the selected ontologies and/or taxonomies. In this example, ontology/taxonomy logic 112 can use a taxonomy such as vehicle information taxonomy 142a, parts and labor taxonomy 142b, or diagnosis taxonomy 142c to determine that the entered term "engin" is likely to be a misspelled version of the attribute "engine". Then, ontology/taxonomy logic 112 can modify the entered term "engin" to be the properly spelled term "engine".

In a related example, ontology/taxonomy logic 112 can receive another entered term "motor" and provide the term to ontology/taxonomy logic 112. In some embodiments, ontology/taxonomy logic 112 can use one or more selectors, such as system selector 120 and/or component selector 150, to select one or more taxonomies that can include entered term "motor" and related preferred terms, such as one or more taxonomies related to vehicular systems and/or components.

In this example, ontology/taxonomy logic 112 can use a taxonomy such as vehicle information taxonomy 142a, parts and labor taxonomy 142b, or diagnosis taxonomy 142c to determine that the entered term "motor" is likely to be a non-preferred term whose related preferred term is "engine", and so modify the entered term "motor" to be the preferred term "engine". Continuing this example, the entered term "motor" can be part of an entered set of terms "motor needs 2 b rebuilt". After replacing "motor" with "engine" and making other textual corrections (e.g., replacing "2" with "to", replacing "b" with "be", and replacing the non-preferred term "rebuilt" with the preferred term "overhauled"), the modified set of terms can be "engine needs to be overhauled".

To obtain additional information about an unspecified attribute, such as a diagnosis-related attribute, ontology/taxonomy logic 112 can request electronic authoring tool software 110 to generate a request, such as a user prompt or database query, to specify the currently-unspecified diagnosis-related attribute. In this example, electronic authoring tool software 110 can use a user interface to prompt repair personnel to provide information about the diagnosis-related attribute, and can receive a second set of terms "the head gasket is blown".

Electronic authoring tool software 110 can the provide the second set of terms ontology/taxonomy logic 112 as a specification of the diagnosis-related attribute, and ontology/taxonomy logic 112 can update the template with a modified version of the second set of terms after modifying the non-preferred term "blown" with a preferred term "defective" and updating the preferred term "overhauled" to change the term's ending to fit the template as the updated term "overhauling". After making these changes, the updated template can read "The engine requires overhauling due to the head gasket being defective". Ontology/taxonomy logic 112 can provide the updated template to electronic authoring tool software 110 and/or computing device 100 for presentation, review, and perhaps additional input from the repair personnel.

Figure 2A:
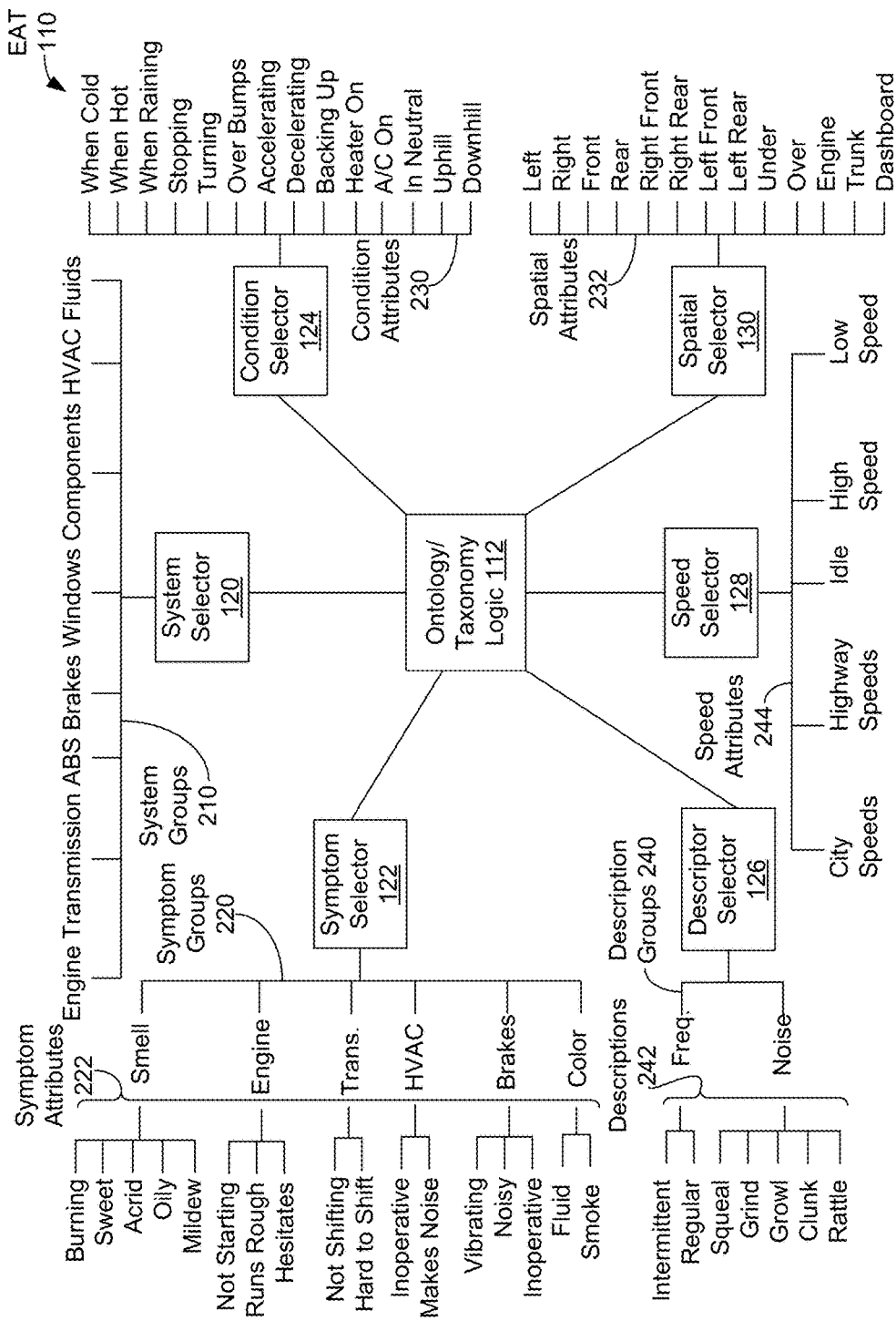
FIG. 2A is a diagram of electronic authoring tool software, in accordance with an embodiment.

FIG. 2A is a diagram of electronic authoring tool software 110, in accordance with an embodiment. Ontology/taxonomy logic 112 of electronic authoring tool software 110 can communicate with one or more selectors, such as system selector 120, symptom selector 122, condition selector 124, descriptor selector 126, speed selector 128, and spatial selector 130 as shown in FIG. 2A.

Ontology/taxonomy logic 112 can communicate with a selector to request information about one or more attributes associated with the selector and, in response, receive the requested information from the selector. For example, if electronic authoring tool software 110 requests information about an attribute, such as a <condition> attribute, electronic authoring tool software 110 can generate and communicate a request about the <condition> attribute to ontology/taxonomy logic 112. In response to the request about the <condition> attribute, ontology/taxonomy logic 112 can determine a selector that is related to the <condition> attribute, such as condition selector 124, and request information about the <condition> attribute from condition selector 124.

Condition selector 124 can provide the requested information to ontology/taxonomy logic 112, where the information can include a listing of one or more attributes, one or more descriptions about one or more attributes, one or more preferred and/or non-preferred terms related to one or more attributes, and/or other information about attributes associated with condition selector 124. In this example, the requested information about the <condition> attribute involves a listing of all possible attributes that could be a <condition> attribute that include a word related to "heat".

Condition selector 124 can examine condition attributes 230 to find all attributes that include the string "heat" to find a "Heater On" attribute. In some embodiments, condition selector 124 can look for attributes with strings similar to and/or related to the string "heat" and additionally find the "When Hot" attribute. The, condition selector 124 can generate a listing of the "Heater On" and perhaps the "When Hot" attribute(s) and provide the listing to ontology/taxonomy logic 112, which in turn can provide the listing of the "Heater On" and perhaps the "When Hot" attribute(s) to electronic authoring tool software 110.

FIG. 2A shows that system selector 120 can be associated with system groups 210. System groups 210 include system groups related to vehicular systems that include system groups for: an "Engine", a "Transmission", an "ABS" or Automatic Braking System, "Brakes", "Windows", "Components", a "HVAC" system or Heating, Ventilating, and Air Conditioning system, and "Fluids". For each system group of system groups 210, additional attributes and/or groups can be included that are related to the system group; e.g., the "Engine" group can have attributes and/or groups related to a fuel system, an "Exhaust System", a "Timing" system, etc.

Symptom selector 122 can be associated with symptom groups 220, which can include "Smell", "Engine", "Trans [mission]", "HVAC", "Brakes", and "Color" symptom groups as indicated in FIG. 2A. Each symptom group of symptoms groups 220 can be associated with symptom attributes of symptom attributes 222.

FIG. 2A also shows that: the "Smell" symptom group can be associated with "Burning", "Sweet", "Acrid", "Oily", and "Mildew" symptom attributes of symptom attributes 222; the "Engine" symptom group can be associated with "Not Starting", "Runs Rough", and "Hesitates" symptom attributes; the "Trans[mission]" symptom group can be associated with the "Not Shifting" and "Hard to Shift" symptom attributes; the "HVAC" symptom group can be associated with the "Inoperative" and "Makes Noise" symptom attributes, the "Brakes" symptom group can be associated with the "Vibrating", "Noisy", and "Inoperative" symptom attributes; and the "Color" symptom group can be associated with the "Fluid" and "Smoke" symptom attributes of symptom attributes 222. In some examples, one attribute can be associated with multiple attribute groups; e.g., the symptom attribute "Inoperative" is associated with both the "HVAC" and "Brakes" symptom groups. In other examples, more, fewer, and/or different symptom groups 220 and/or symptom attributes 222 can be associated with symptom selector 122.

Condition selector 124 can be associated with condition attributes 230, which include condition-related attributes such as "When Cold", "When Hot", "When Raining", "Stopping", "Turning", "Over Bumps", "Accelerating", "Decelerating", "Backing Up", "Heater On", "A/C On" which can abbreviate an "air conditioner on" condition, "In Neutral", "Uphill", and "Downhill", as shown in FIG. 2A. In other examples, more, fewer, and/or different condition attributes 230 can be associated with condition selector 124.

Descriptor selector 126 can be associated with description groups 240. Each description group can include one or more description attributes or descriptions 242. For example, description groups 240 include a "Freq[uency]" group of descriptions and a "Noise" group of descriptions. FIG. 2A shows that the "Freq[uency]" description group includes "Intermittent" and "Regular" descriptions of descriptions 242, and the "Noise" group of descriptions includes "Squeal", "Grind", "Growl", "Clunk", and "Rattle".

Speed selector 128 can be associated with speed attributes 244, which include speed-related attributes such as "City Speeds", "Highway Speeds", "Idle", "High Speed", "Low Speed" as shown in FIG. 2A. In other examples, more, fewer, and/or different speed attributes 244 can be associated with speed selector 128.

Spatial selector 130 can be associated with spatial attributes 232, which include space-related attributes such as "Left", "Right", "Front", "Rear", "Right Front", "Right Rear", "Left Front", "Left Rear", "Under", "Over", "Engine", "Trunk", and "Dashboard", as shown in FIG. 2A. In other examples, more, fewer, and/or different spatial attributes 232 can be associated with spatial selector 130.

Selectors can operate on a hierarchy or other organization of attributes that can include individual attributes and groups of attributes. For example, spatial selector 130 can operate on one unnamed group of spatial attributes shown in FIG. 2A as spatial attributes 232. As another example, system selector 120 can operate on groups of attributes shown in FIG. 2A as system groups 210. As a third example, symptom selector 122 can operate on groups of attributes shown in FIG. 2A as symptom groups 220 which in turn include individual attributes shown in FIG. 2A as symptom attributes 222. In other examples not shown in FIG. 2A, a selector can apply one or more selection techniques to both groups and individual attributes, operate on groups of groups (of groups . . . ) of attributes, and/or operate on different organizations of attributes and groups of attributes than the hierarchical organizations shown in FIG. 2A.

In some embodiments, attributes can be related to other attributes. As one example, a group of attributes can be considered to be related to each other as being part of the same group. As another example, the "Rattle" description attribute can be related to an audio attribute with a recording of a (typical) rattle sound and/or an image of a component that typically makes a rattle sound. As another example, one attribute can represent a non-preferred and/or misspelled term that is related to a preferred and/or correctly spelled term; e.g., an attribute for a non-preferred term "motor" and/or an attribute for a misspelled term "engin" can be related to an attribute for the preferred, properly spelled term "engine". Many other examples of attribute relationships are possible as well.

Figure 2B:
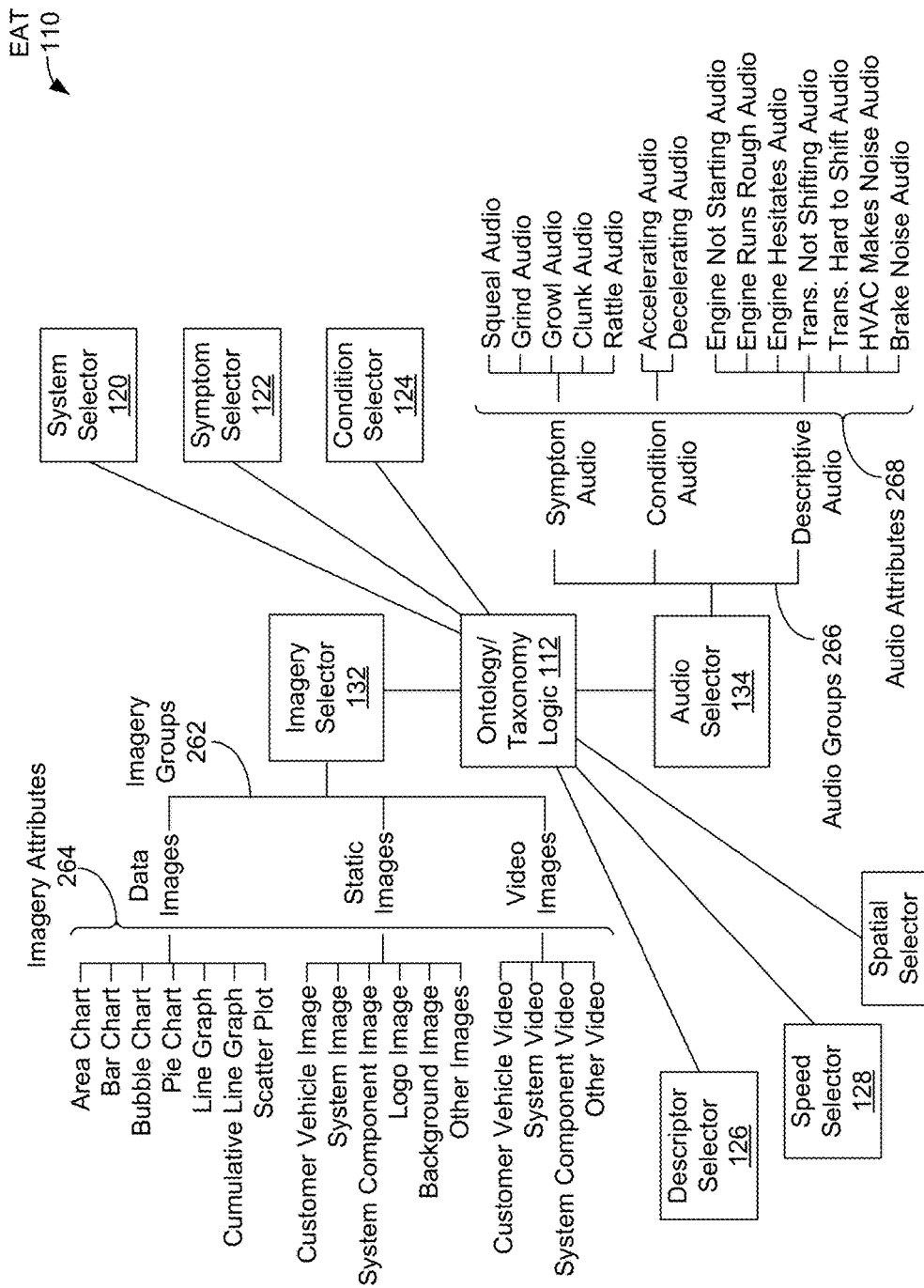
FIG. 2B is another diagram of electronic authoring tool software, in accordance with an embodiment.

FIG. 2B is another diagram of electronic authoring tool software 110, in accordance with an embodiment. FIG. 2B shows that ontology/taxonomy logic 112 of electronic authoring tool software 110 can be associated with selectors 120, 122, 124, 126, 128, and 130 shown and discussed above in more detail in the context of FIG. 2A, and can be associated with audio selector 132 and video selector 134.

Imagery selector 132 can be associated with imagery groups 262. Each imagery group can include one or more imagery attributes 264. For example, imagery groups 262 include a "Data Images" group of imagery attributes, "Static Images" group of imagery attributes, and "Video Images" group of imagery attributes. FIG. 2B shows that the "Data Images" group includes "Area Chart", "Bar Chart", "Bubble Chart", "Pie Chart", "Line Graph", "Cumulative Line Graph", and "Scatter Plot" imagery attributes 264. The imagery attributes in the "Data Images" group can include attributes indicating techniques to specify, describe, and/or display data sets; e.g., the "Bar Chart" imagery attribute can indicate that a bar chart technique can be used to display a data set. Such imagery attributes can include attributes that specify sub-attributes of the technique; e.g., for the "Bar Chart" imagery attribute, sub-attributes can include, but are not limited to, sub-attributes related to the data set displayed using a bar chart, number of bars, colors of bars, axis labels, orientation (e.g., horizontal, landscape, vertical, portrait), font sizes, and labels related to the bar chart.

FIG. 2B shows that the "Static Images" group can include image attributes indicating individual and/or groups of static images (e.g., electronic photographs, drawings, etc.). FIG. 2B shows that the "Static Images" group includes "Customer Vehicle Image" imagery attribute of imagery attributes 264 of that are related to images of customer vehicles, "System Image" imagery attribute related to images of systems of vehicles (e.g., engines, transmission, brakes), "System Component Image" imagery attribute related to images of vehicle components (e.g., air filters, gears, calipers), "Logo Image" imagery attribute related to one or more logos related to vehicle repair (e.g., a logo of a repair facility, logos of component suppliers), "Background Image" imagery attribute related to background images (e.g., backgrounds of repair orders), and "Other Images" imagery attribute related to other static images. FIG. 2B shows that the "Video Images" group can include imagery attributes of imagery attributes 264 indicating individual and/or groups of video imagery (i.e., moving imagery), where the. "Video Images" imagery group can include "Customer Vehicle Video" imagery attribute related to videos of customer vehicles, "System Video" imagery attribute related to videos of systems of vehicles, "System Component Image" imagery attribute related to videos of vehicle components and "Other Video" imagery attribute related to other videos.

Audio selector 134 can be associated with audio groups 266. Each audio group can include one or more audio attributes 268. For example, imagery groups 266 include a "Symptom" group of audio attributes, "Condition Audio" group of audio attributes, and "Descriptive Audio" group of audio attributes. FIG. 2B shows that the "Symptom Audio" group includes "Squeal Audio" audio attribute related to audio of squealing sounds/squeal symptoms, "Grind Audio" audio attribute related to audio of grinding sounds/grind symptoms, "Growl Audio" audio attribute related to audio of growling sounds/growl symptoms, "Clunk Audio" audio attribute related to audio of clunking sounds/clunk symptoms, and "Rattle Audio" audio attribute related to audio of rattling sounds/rattle symptoms of audio attributes 268.

FIG. 2B shows that the "Condition Audio" group includes "Accelerating Audio" audio attribute related to audio recording and/or about accelerations and "Decelerating Audio" audio attribute related to audio recording and/or about decelerations of audio attributes 268. FIG. 2B also shows that the "Descriptive Audio" group includes "Engine Not Starting Audio" audio attribute related to audio of engines failing to start/turn-over, "Engine Runs Rough Audio" audio attribute related to audio of engines operating roughly, "Engine Hesitates Audio" audio attribute related to audio of engines operating in a hesitant fashion, "Trans. Not Shifting Audio" audio attribute related to audio of transmissions failing to shift, "Trans. Hard to Shift Audio" audio attribute related to audio of transmissions hesitating to shift, "HVAC Makes Noise Audio" audio attribute related to HVAC system noises, and "Brake Noise Audio" audio attribute related to audio of brake noises of audio attributes 268. In some embodiments, electronic authoring tool software 110 can be associated with more, fewer, and/or different selectors than shown in FIG. 2A and/or FIG. 2B.

FIG. 2C shows example ontology 140a that includes templates 270, 272, 274, 276. Each template shown in FIG. 2C shows an ordering that specifies how attributes can be entered and/or displayed for a particular conceptual item using electronic authoring tool software 110. For example, sentence template 270 indicates that a sentence (an example of a conceptual item) can include, in order, a symptom attribute, a description attribute, a spatial attribute, a system attribute, a condition attribute, and a speed attribute. As another example, sentence template 272 indicates that a sentence can include, in order, a spatial attribute, a system attribute, a description attribute, a symptom attribute, a condition attribute, and a speed attribute.

Continuing this example, example values can include: "burning smell" for the symptom attribute, "regular" for the description attribute, "front" for the spatial attribute, "radiator of the engine" for the system attribute, "when hot" for the condition attribute, and "at any speed" for the speed attribute. Then, a sentence that can be generated by electronic authoring tool software 110 and/or ontology/taxonomy logic 112 using sentence template 270 can be "The customer noticed a burning smell on a regular basis from the front of the vehicle and/or the radiator of the engine that occurred when hot and/or when the vehicle was operated at any speed" where the bold terms shown above represent example predetermined attribute values that can be inserted into template 270 to replace variable attribute values.

Further, a different sentence that can be generated by electronic authoring tool software 110 and/or ontology/taxonomy logic 112 using sentence template 272 can be "The front of the vehicle and/or the radiator of the engine had a regular burning smell that occurred when hot and/or when the vehicle was operated at any speed" where the bold terms are example attribute values that can be inserted into template 272. Many other example sentences and templates are possible as well.

Multiple templates can exist and be used for the same conceptual item. For example, FIG. 2C shows two sentence templates 270, 272 for a sentence and shows two repair order templates 274, 276 for a repair order (another example conceptual item). If multiple templates exist for a particular conceptual item, then the templates can vary between orderings, numbers, and/or types of attributes, leading to different specific conceptual items. For example, sentence templates 270, 272 both refer to the same six attributes—symptom, description, spatial, symptom, condition, and speed attributes—but order the six attributes differently. As another example, repair order templates 274, 276 have different numbers and types of attributes—both repair order templates 274, 276 order a vehicle information attribute before a cause attribute, and order the cause attribute before a parts and labor attribute. Repair order template 274 includes only those three attributes—vehicle information, cause, and parts and labor attributes. However, repair order template includes six attributes ordered as vehicle information, cause, diagnosis, parts and labor, commonly replaced parts graph, and additional related parts attributes. In other examples, ontology 140a can include more, fewer, and/or different templates and/or templates that use different wordings.

FIG. 2D shows example ontology 140b expressed as a table of attribute group values 280 and attribute values 282. Ontology 140b can relate attribute groups and attributes. FIG. 2D shows that ontology 140b includes:

1. first and second non-heading rows indicating a "Fluid" attribute group includes "Coolant" and "Fuel" attributes,
2. a third non-heading row indicating a "Freq." attribute group includes "Intermittent" attribute,
3. fourth and fifth non-heading rows indicating a "Speed" attribute group includes "High Speed" and "Low Speed" attributes, 4. sixth, seventh, and eighth non-heading rows indicating a "Spatial" attribute group can include "Front", "Inside", and "Left" attributes,
5. ninth, tenth, eleventh, and twelfth non-heading rows indicating a "System" attribute group can include "Air Conditioning", "Brakes", "Door Lock", and "Window" attributes, and
6. thirteenth, fourteenth, fifteenth, and sixteenth non-heading rows indicating a "Condition" attribute group can include "Accelerating", "Over Bumps", "Hot", and "Stopping" attributes.

Using ontology 140b and related tables, relationships between attribute groups and attributes such as the relationships shown in FIGS. 2A and 2B can be specified, as well as other relationships between attribute groups and attributes. More, fewer, and/or different attribute groups, attributes, and/or relationships between attribute groups and attributes can be specified and/or expressed using ontology 140b.

Example User Interfaces Related to Repair Orders and Corresponding Ontology/Taxonomy Logic FIGS. 3A-3D depict example views of user interface (UI) 310 of computing device 100 used for entering data for a repair order, such as a vehicular repair order, in accordance with an embodiment. For example, user interface 310 can be a graphical user interface. In the specific example shown in FIGS. 3A-3D, user interface 310 is a graphical user interface for electronic authoring tool software 110. Then, user interface 310 can be used to enter, modify, display, and/or update data related to repair orders including, but not limited to, data related to vehicle information, (customer) complaints, causes for (customer) complains, repairs, parts and labor, commonly replaced parts, and/or additionally replaced parts.

Figure 3A:
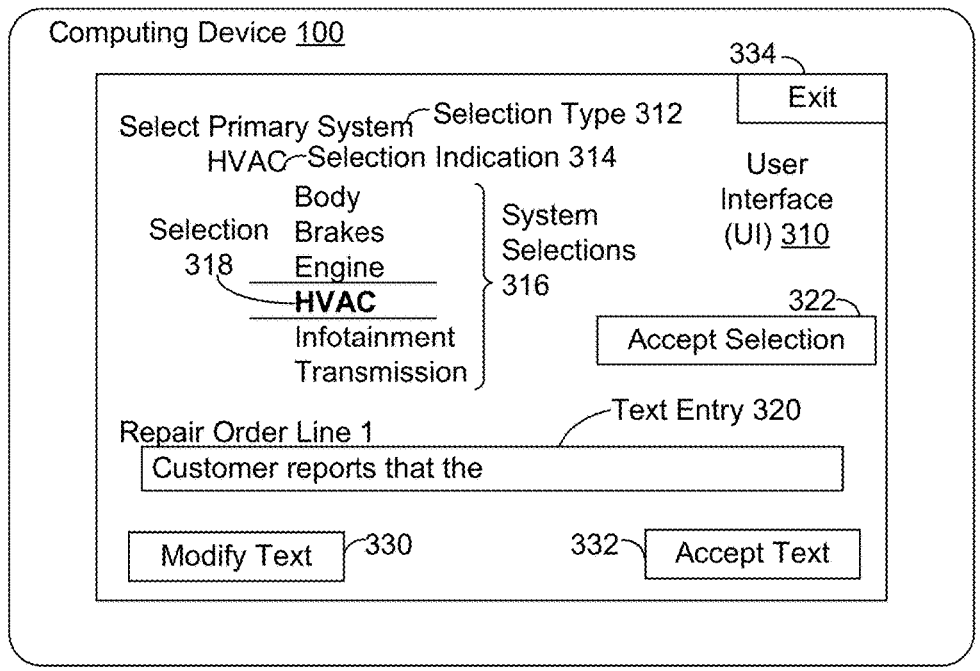
FIGS. 3A-3D depict example views of a user interface of a computing device used for entering data for a repair order, in accordance with an embodiment.

FIG. 3A shows that user interface 310 includes selection type display 312, selection indication display 314, system selections 316 including selection 318, text entry region 320, and buttons 322, 330, 332, 334. In particular, user interface 310 can be used to enter (customer) complaint data as text via text entry region 320. In other embodiments, user interface 310 can be used to enter data via other modalities, such as images, sounds, etc.; e.g., user interface 310 can enable uploading of sounds, images, videos, etc. related to repair orders.

While text is entered in text entry region 320, electronic authoring tool software 110 and/or user interface 310 can process entered text, generate displays, and/or modify the entered text. The text can be modified based on one or more templates associated with one or more ontologies, such as templates shown associated with ontology 140a of FIG. 2C. The template can be used to arrange text according to an ordering of attributes specified by the template. Also, as the template can include attributes, computing device 100, electronic authoring tool software 110, and/or user interface 310 can use the template to determine attributes and/or attribute groups related to the entered text and modify the entered text based on the determined attributes and/or attribute groups.

For example, FIG. 3A shows that the text entered in text entry region 320 currently reads as "Customer reports that the". In this example, electronic authoring tool software 110, ontology/taxonomy logic 112, and/or user interface 310 can select a template. The template can be associated with the entered text can indicate that text is to be entered related to a system attribute; e.g., the template can have an ordering indicating that a variable system-related attribute is to be entered. Then, as a system-related attribute is to be provided, electronic authoring tool software 110 can instruct user interface 310 to display selection type display 312 which reads "Select Primary System" to prompt entry of the system attribute. To aid and/or prompt entry of the system attribute, electronic authoring tool software 110 can instruct user interface 310 to display system selections 316 showing example system attributes, such as "Body", "Brakes", "Engine", "HVAC", "Infotainment", and "Transmission."

User interface 310 can receive input to make a selection of system selections 316; e.g., mouse input, keyboard input, touch input. In the example shown in FIG. 3A, selection indication 314 and selection 318 both indicate that "HVAC" is chosen from among system selections 316. User interface 310 can accept additional input to change the selection, accept the selection, and/or make a new selection. In one example, an acceptance input, such as a touch of user interface 310 on the displayed "HVAC" or on accept selection button 322, a mouse click on the displayed "HVAC", or pressing of a key (e.g., an enter key) can accept the "HVAC" selection. In another example, a second input can change and/or make a new selection that differs from selection 318, such as a touch or mouse click on a different selection of system selections 316, scroll-wheel input, and/or entry of text in text entry region 320.

Buttons 330, 332, and 334 can control aspects of user interface 310. Modify text button 330 can be used to explicitly request modification of text. For example, if text of "A/C" were entered using text entry region 320, selection of modify text button 330 can be used to accept text entered in text entry region 320 and determine one or more templates associated with the accepted text; e.g., by using ontology/taxonomy logic 112 to search one or more ontologies for templates associated with the accepted text. After determining the template(s), the accepted text can be modified, perhaps based on the template(s); e.g., spelling errors in the accepted text can be corrected, the accepted text can be reordered to conform to an ordering of wording/attributes specified by the template(s), words can be added, deleted, and/or changed to the accepted text to conform to wording specified by the template(s), non-preferred terms for attributes specified in the template(s) can be found in the accepted text and replaced with preferred terms. Other techniques for modifying entered text are possible as well.

After the text has been modified, the modified text can then be displayed using user interface 310; e.g., the modified text can replace the entered text in text entry region 320. Continuing this example, the entered text includes the term "A/C". Upon acceptance of the entered text, electronic authoring tool software 110; e.g., ontology/taxonomy logic 112 can find a template related to the entered text can be found in an ontology that includes a system attribute. Preferred terms and non-preferred terms related to the system attribute and the entered term "A/C" can be searched in one or more ontologies and/or taxonomies. Then, electronic authoring tool software 110; e.g., ontology/taxonomy logic 112 can determine that the entered text "A/C" is a non-preferred term for an air conditioning system with a related preferred term of "HVAC". Then, electronic authoring tool software 110 can replace the non-preferred term "A/C" in the accepted text with the preferred term "HVAC" and can then instruct user interface 310 to display the modified text with the preferred term "HVAC".

Accept text button 332 can be used to accept text displayed in text entry region 320. In some embodiments, once text is accepted, then the accepted text can be modified using the techniques discussed above regarding modify text button 330. In other embodiments, text accepted after accept text button 332 is not modified by electronic authoring tool software 110. Exit button 334 can be used to close user interface 310 and perhaps end execution of electronic authoring tool software 110 on computing device 100.

Figure 3B:
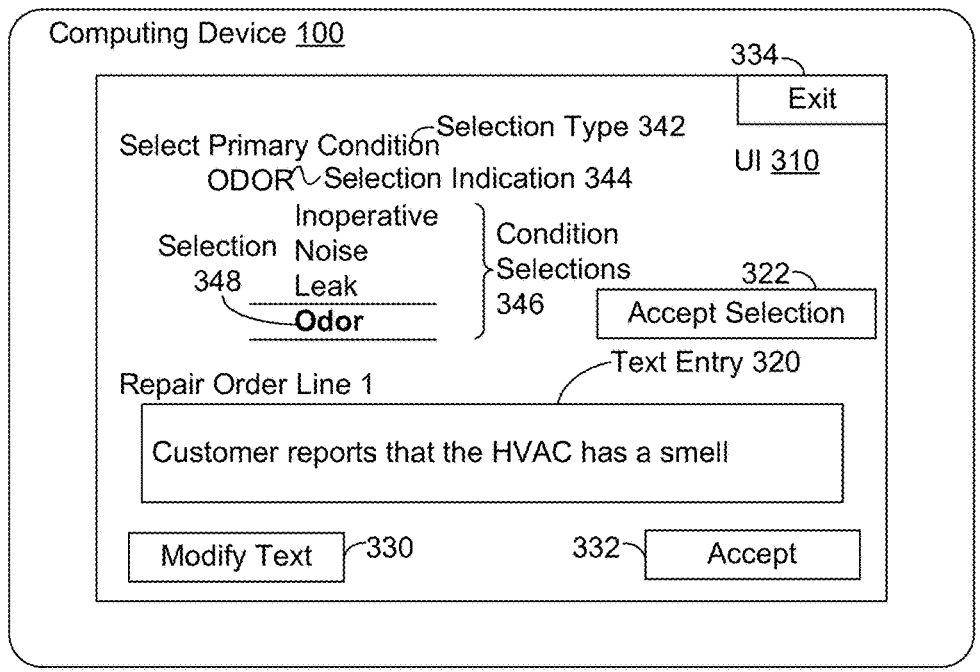

FIG. 3B shows user interface 310 updated after additional text has been entered in comparison to the text shown in FIG. 3A. In particular, FIG. 3A shows text in text entry region 320 of "Customer reports that the" and FIG. 3B shows that text in text entry region 320 of "Customer reports that the HVAC has a smell".

In this example, a template associated with the entered text of FIG. 3B can indicate that text being entered relates to a condition attribute. Then, electronic authoring tool software 110 can instruct user interface 310 to display selection type display 342 with "Select Primary Condition" and to present condition selections 346 that include "Inoperative", "Noise", "Leak", and "Odor". In this example, electronic authoring tool software 110 can use ontology/taxonomy logic 112 to process the text entered in text entry region 320 that includes the word "smell", determine that "smell" is a non-preferred term related to a preferred term "odor" for a condition attribute, and suggest selection 348 of the preferred term "odor". In the example shown in FIG. 3B, both selection 348 and selection indication 344 indicate that "Odor" is chosen from among system selections 346.

The example continues with the term "odor" being accepted as part of the text entered using text entry region 320. Upon acceptance of the term "odor", the text in text entry region 320 can be modified to replace the words "a smell" with the words "an odor".

Figure 3C:
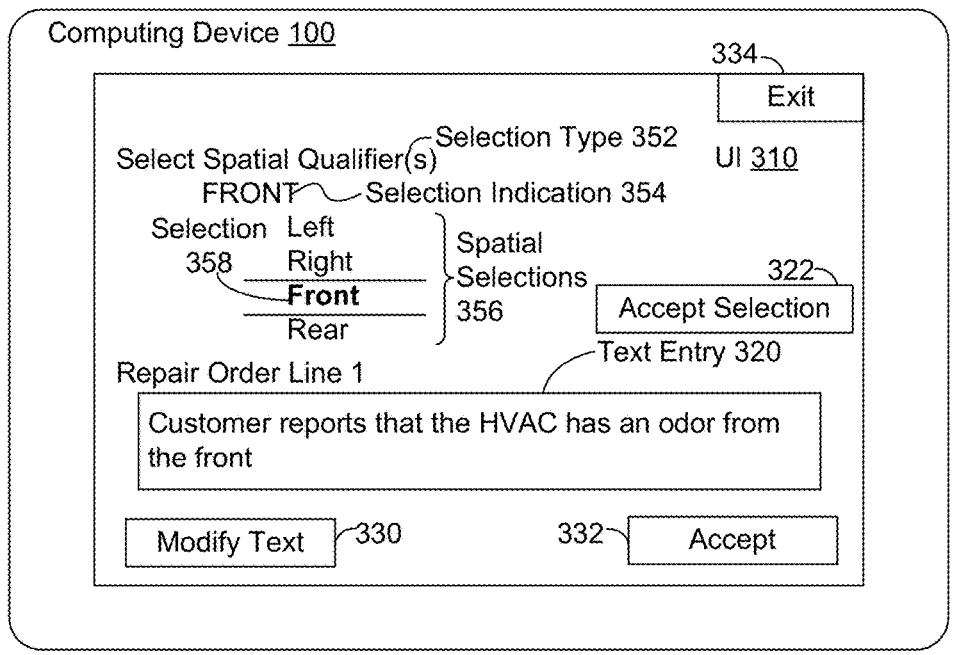

FIG. 3C shows user interface 310 updated after additional text has been entered in comparison to the text shown in FIG. 3B. In particular, FIG. 3B shows text in text entry region 320 of "Customer reports that the HVAC has a smell" and FIG. 3C shows text in text entry region 320 of "Customer reports that the HVAC has an odor from the front".

In this example, a template associated with the entered text of FIG. 3C can indicate that text being entered relates to a spatial attribute. Then, electronic authoring tool software 110 can instruct user interface 310 to display selection type display 352 with "Select Spatial Qualifier(s)" and to present spatial selections 356 that include "Left", "Right", "Front", and "Rear". In this example, electronic authoring tool software 110 can use ontology/taxonomy logic 112 to process the text entered in text entry region 320 that includes the word "front" determine that "front" is a preferred term for a spatial attribute, and suggest selection 358 of the preferred term "front". In the example shown in FIG. 3C, both selection 358 and selection indication 354 both indicate that "Front" is chosen from among spatial selections 356.

The example continues with the term "front" being accepted as part of the text entered using text entry region 320.

Figure 3D:
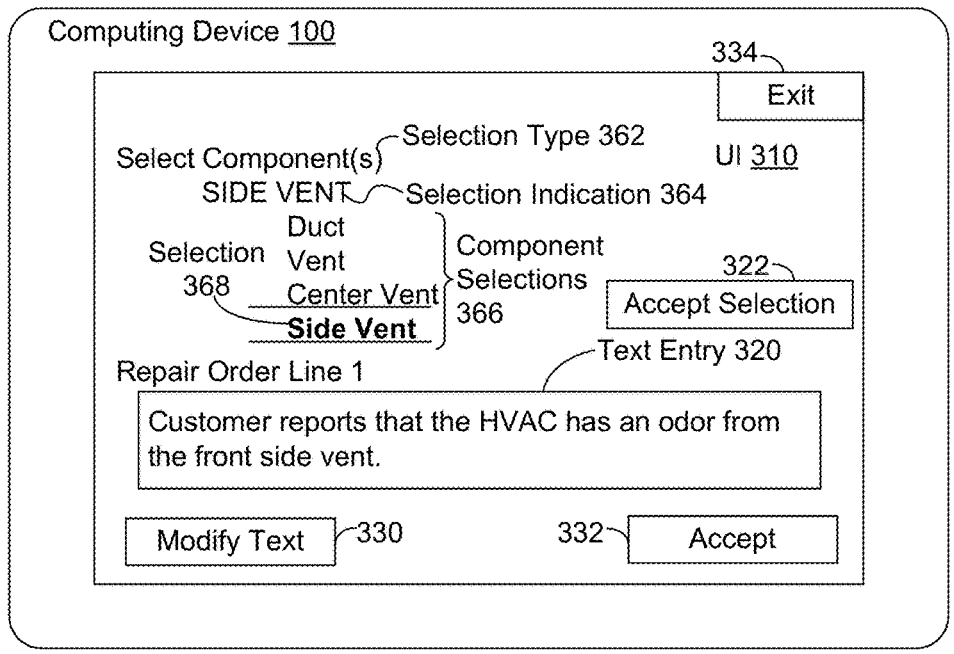

FIG. 3D shows user interface 310 updated after additional text has been entered in comparison to the text shown in FIG. 3C. In particular, FIG. 3C shows text in text entry region 320 of "Customer reports that the HVAC has an odor from the front" and FIG. 3D shows that text in text entry region 320 of "Customer reports that the HVAC has an odor from the front side vent."

In this example, a template associated with the entered text of FIG. 3D can indicate that text being entered relates to a component attribute, such as a component of the previously-selected HVAC system. Then, electronic authoring tool software 110 can instruct user interface 310 to display selection type display 362 with "Select Component(s) and to present component selections 366 that include "Duct", "Vent", "Center Vent", and "Side Vent". In this example, electronic authoring tool software 110 can use ontology/taxonomy logic 112 to process selection 368 of "Side Vent" (e.g., a selection made using a finger press, key press, or mouse click) to insert corresponding text of "side vent" into the text displayed in text entry region 320. In the example shown in FIG. 3D, selection indication 364 indicates that "SIDE VENT" has been chosen from among components 366. The example continues with the term "side vent" being added to the text entered using text entry region 320.

In other examples, user interface 310 can allow multiple selections from component selections 366 or other displayed selections (e.g., system selections 316, condition selections 346, spatial selections 356). In these examples, electronic authoring tool software 110 can make multiple modifications to entered text and/or other data based on the multiple selections. For a particular example related to FIG. 3D, if there was a complaint of a smell coming from both a front side vent and a center vent of an HVAC system, then both "Center Vent" and "Side Vent" can be selected from component selections 366 to make multiple modifications to the text displayed in text entry region 320; e.g., to add the term "side vent", add the word "and", and add the term "the center vent". The resulting text for this particular example can be "Customer report that the HVAC has an odor from the front side vent and the center vent".

FIGS. 4A-4D depict example views of another user interface of a computing device used for entering data for a repair order, in accordance with an embodiment. The example shown in FIGS. 4A-4D involves entry of the same text discussed above in the context of FIGS. 3A-3D, but the text is entered using user interface 410 instead of user interface 310.

In the specific example shown in FIGS. 4A-4D, user interface 410 is a graphical user interface for electronic authoring tool software 110 that can be used to enter, modify, display, and/or update data related to repair orders such as discussed above in the context of user interface 310.

Figure 4A:
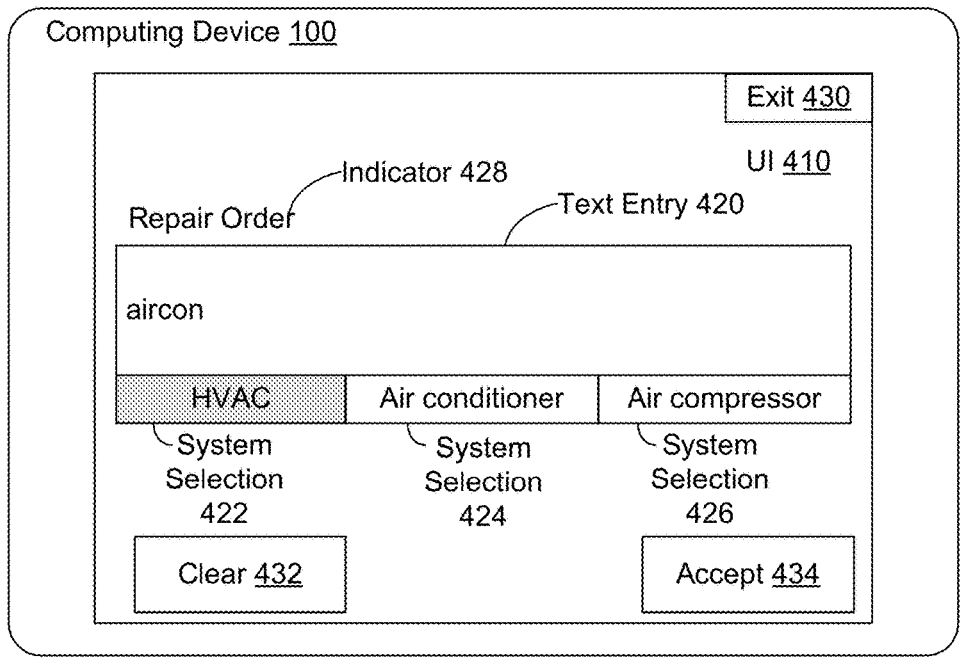
FIGS. 4A-4D depict example views of another user interface of a computing device used for entering data for a repair order, in accordance with an embodiment.

FIG. 4A shows that user interface 410 includes text entry region 420, selections 422, 424, 426, indicator 428, and buttons 430, 432, 434. In particular, user interface 410 can be used to enter (customer) complaint data as text via text entry region 420. In other embodiments, user interface 410 can be used to enter data via other modalities, such as images, sounds, etc.; e.g., user interface 410 can enable uploading of sounds, images, videos, etc. related to repair orders.

While text is entered in text entry region 420, electronic authoring tool software 110 and/or user interface 410 can process entered text, generate displays, and/or modify the entered text. The text can be modified based on one or more templates associated with one or more ontologies, such as templates shown associated with ontology 140a of FIG. 2C. Modification of text based on one or more templates is discussed above in more detail in the context of user interface 310.

FIG. 4A shows that the text entered in text entry region 420 currently reads as "aircon" and indicator 428 of "Repair Order" indicating that electronic authoring tool software 110 is expecting text related to repair orders. In this example, electronic authoring tool software 110, ontology/taxonomy logic 112, and/or user interface 410 can use the text of "aircon" from text entry region 420 and locate attributes and/or templates that indicate the "aircon" text can be related to a system, such as an HVAC system, and/or components of the HVAC system. Then, electronic authoring tool software 110, ontology/taxonomy logic 112, and/or user interface 410 can determine the "aircon" text relates to a system attribute. As a system attribute is or has been entered via user interface 410, electronic authoring tool software 110 can instruct user interface 410 to present selections related to the system attribute. In the example shown in FIG. 4A, user interface 410 presents three system selections: selection 422 of "HVAC", selection 424 of "Air conditioner", and selection 426 of "Air Compressor".

In the example shown in FIG. 4A, user interface 410 receives an acceptance input choosing system selection 422; e.g., mouse input, keyboard input, touch input. After receiving the acceptance input, user interface 410 changes display of system selection 422 to have a gray background to indicate the choice of selection 422; in other examples, other techniques, including other visual techniques, can indicate a choice of a selection. User interface 410 can accept additional input to change the selection, accept the selection, and/or make a new selection. In one example, the acceptance input can be a touch (e.g., received via a touch screen) of user interface 410 on system selection 422, a mouse click on system selection 422, or pressing of a key (e.g., an enter key). In another example, a second input can change and/or make a new selection that differs from selection 422, such as a touch or mouse click on a different selection than selection 422, scroll-wheel input, and/or entry of text in text entry region 420.

Buttons 430, 432, and 434 can control aspects of user interface 410. Exit button 430 can be used to close user interface 410 and perhaps end execution of electronic authoring tool software 110 on computing device 100. Clear button 432 can be used to remove and/or clear text from text entry region 420. Accept button 434 can be used to enter and/or text from text entry region for processing by electronic authoring tool software 110, ontology/taxonomy logic 112, and/or user interface 410.

In the example shown in FIG. 4A, selection of system selection 422 and/or selection of accept button 434 can be used to explicitly request modification of text. Requesting modification of text and subsequently modifying text is discussed above in more detail in the context of user interface 310. In this example, selection of system selection 422 causes modification of the "aircon" text to be "Customer reports that the HVAC". After the text has been modified, the modified text can then be displayed using user interface 410; e.g., the modified text can replace the entered text in text entry region 420.

Figure 4B:
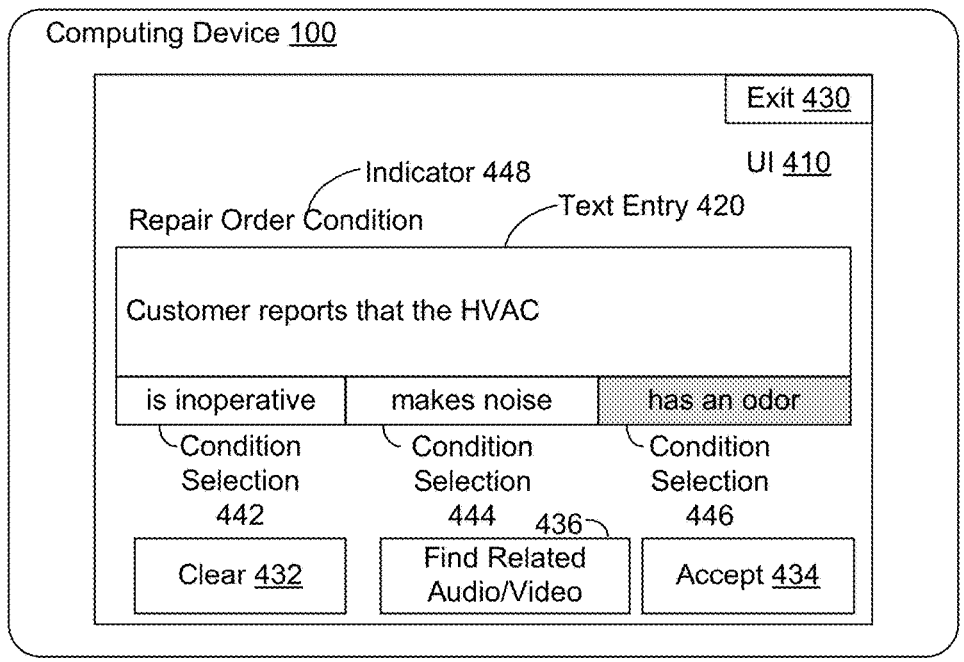

FIG. 4B shows user interface 410 updated after the "aircon" text of FIG. 4A has been modified and displayed to be "Customer reports that the HVAC". In this example, a template associated with the displayed text of FIG. 4B can include that text to be entered relates to a condition attribute. Then, electronic authoring tool software 110 can instruct user interface 410 to present indicator 448 indicating choices for "Repair Order Selection", condition selections including condition selection 442 of "is inoperative", condition selection 444 of "makes noise", and condition selection 446 of "has an odor". In the example shown in FIG. 4B, condition selection 446 is shown in gray to indicate a choice of condition selection 446 and related text of "has an odor".

The example continues with the phrase "has an odor" being accepted as part of the text, and the text updated to display "has an odor" in text entry region 420. After text entry region is updated, additional text of "fron" is entered using text entry region 420.

Figure 4C:
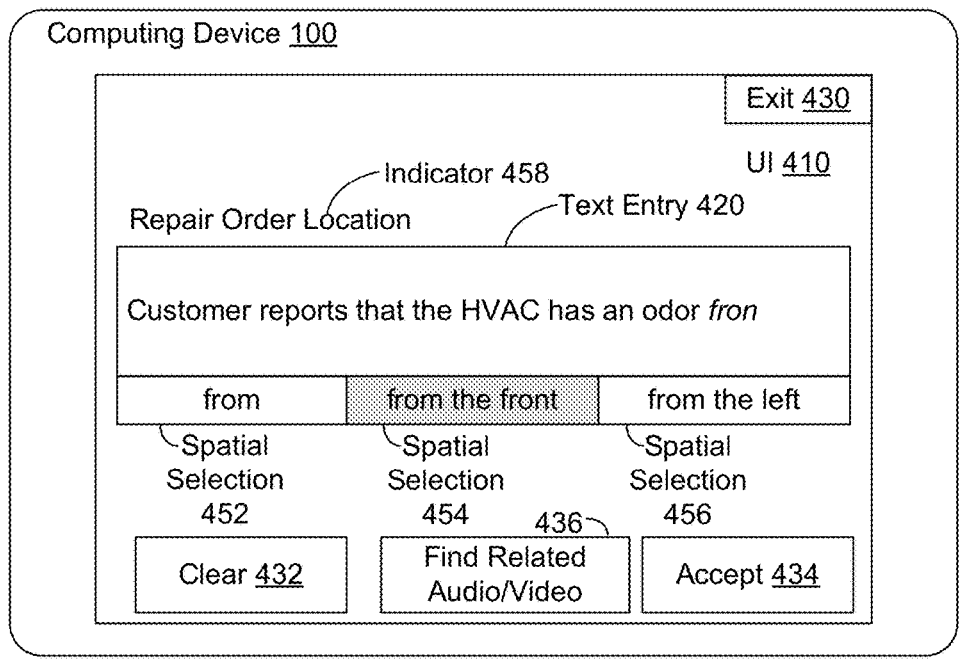

FIG. 4C shows text entry region 420 of user interface 410 updated after the phrase "has an odor" has been added and additional text of "fron" has been entered. In this example, a template associated with the entered text "fron" can indicate that "fron" should relate to a spatial attribute, as also shown by indicator 448 indicating choices for "Repair Order Location". In some embodiments, such as shown in FIG. 4C, a visual indication of a misspelled word can be used by user interface 410 to show that a word is misspelled; in this example, user interface 410 determines that the word "fron" is a misspelled word and indicates this determination using italics.

Then, electronic authoring tool software 110 can instruct user interface 410 to present spatial selections including spatial selection 452 of "from", spatial selection 454 of "from the front", and spatial selection 456 of "from the left". In the example shown in FIG. 4C, spatial selection 454 is shown in gray to indicate a choice of spatial selection 454 and related text of "from the front". After receiving the choice of spatial selection 454, the text in text entry region can be modified to replace "fron". In other examples, another visual and/or other types of indications (e.g., auditory, haptic) can be used to indicate a misspelled word. In still other examples, visual and/or other types of indications can be used to identify text in text entry region that would be modified and/or replaced by choice of a selection; e.g., identify that the text "fron" is to be modified/replaced by "from the front" if spatial selection 454 is chosen.

Figure 4D:
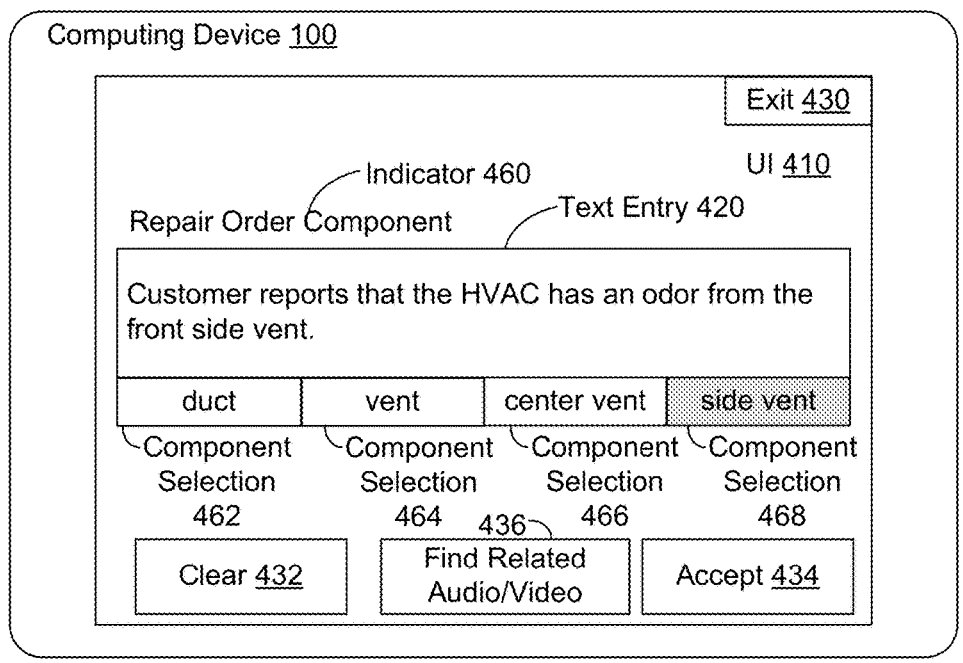

The example continues with the "fron" being replaced with "from the front" in text entry region 420 after spatial selection 454 is chosen. FIG. 4D shows user interface 410 updated after "from the front" has replaced "fron" in the text shown in FIG. 4C. The resulting text is shown in FIG. 4D as "Customer reports that the HVAC has an odor from the front" shown in text entry region 420. Text entry region 420 also shows the term "side vent" added to that text, further resulting in text of text entry region 420 of "Customer reports that the HVAC has an odor from the front side vent."

In this example, a template associated with the displayed text of "Customer reports that the HVAC has an odor from the front" can indicate that text to be entered relates to a component attribute. Then, electronic authoring tool software 110 can instruct user interface 410 to present indicator 460 indicating choices related to "Repair Order Component [s]" and component selections, which include component selection 462 of "duct", component selection 464 of "vent", component selection 466 of "center vent", and component selection 468 of "side vent".

In the example shown in FIG. 4D, component selection 468 is shown in gray to indicate a choice of component selection 468 and related text of "side vent". After receiving the choice of component selection 468, the text in text entry region can be modified to add the words "side vent" as shown in FIG. 4D.

In other examples, user interface 410 can allow multiple selections from component selections 462-468 or other displayed selections (e.g., system selections 422-426, condition selections 442-446, spatial selections 452-456). In these examples, electronic authoring tool software 110 can make multiple modifications to entered text and/or other data based on the multiple selections. For a particular example related to FIG. 4D, if there was a complaint of a smell coming from both a front side vent and a center vent of an HVAC system, then both component selections 468 and 466 (in that order) can be selected to make multiple modifications to the text displayed in text entry region 420; e.g., to add the term "side vent", add the word "and", and add the term "the center vent". The resulting text for this particular example can be "Customer reports that the HVAC has an odor from the front side vent and the center vent".

FIG. 5A depicts an example view of a user interface of computing device 100 used for displaying a repair order 500, in accordance with an embodiment. For example, the user interface for repair order 500 can be provided by electronic authoring tool software 110 utilizing at least repair order display generator 160.

Repair order 500 includes vehicle information 510, diagnosis 512, and parts and labor information 514. Vehicle information 510 can include data about a vehicle under repair. In the example shown in FIG. 5A, vehicle information 510 indicates that the vehicle under repair was manufactured in "2002" having a make (manufacturer), model, and sub-model respectively of "Honda", "Civic", and "DX", and the vehicle under repair includes a "1.7L" engine. In other examples, more, less, and/or different information can be provided as vehicle information.

Diagnosis 512 can include information related to a diagnosis of the vehicle under repair, including, but not limited to, complaint information, cause information, and/or repair information. In the example shown in FIG. 5A, diagnosis 512 includes complaint information that "The customer states the engine idles rough with A/C on" and repair information that an "Air control valve was checked and replaced". In some embodiments, complaint information and/or repair information can be modified by electronic authoring tool software 110 prior to generation of repair order 500.

Parts and labor information 514 can include information about parts and/or labor used to fix the vehicle under repair. In the example shown in FIG. 5A, parts and labor information 514 indicates that an "Idle Air Control Valve" having part number "18011-P7C-IACV7" was used to fix the vehicle under repair and that the above-mentioned replacement of the air control valve took labor of "1.0 hr." Parts and labor information 514 also shows a price for the "Idle Air Control Valve" of "$98.76" and a labor cost of "$95.00" for a total of "$193.76". In some embodiments, parts and labor information 514 can include other information than parts and labor information, such as information about additional costs, discounts, coupons, payments, and more information related to repair order 500.

Figure 5B:
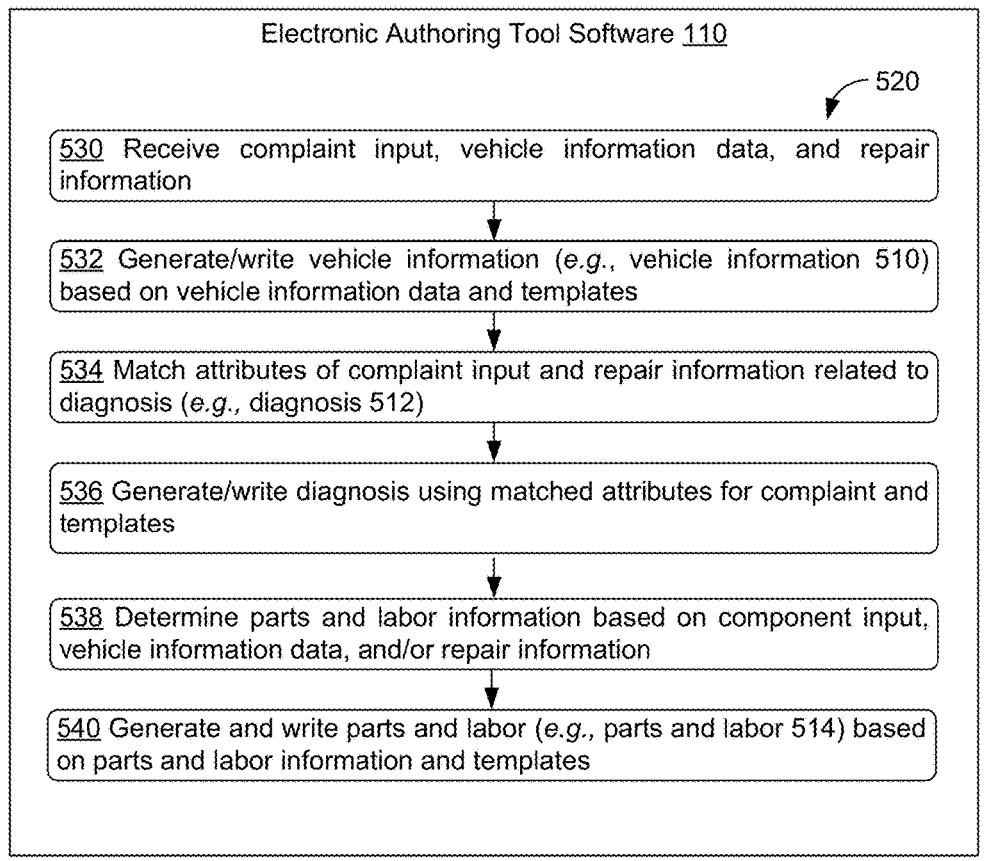
FIG. 5B depicts a flowchart for electronic authoring tool software related to the user interface depicted by FIG. 5A, in accordance with an embodiment.

FIG. 5B depicts a flowchart for electronic authoring tool software 110 related to the user interface depicted by FIG. 5A, in accordance with an embodiment. The flowchart illustrates method 520 that can be performed by electronic authoring tool software 110 to generate a repair order, such as repair order 500 shown in FIG. 5A.

As indicated in FIG. 5B, method 520 can begin at block 530 where electronic authoring tool software 110 can receive complaint input, vehicle information data, and repair information. The complaint input can specify one or more symptoms, conditions, systems, etc. related to and/or specifying one or more complaints with a vehicle under repair. The vehicle information data can include information about the vehicle under repair, such as, but not limited to, year, make, model, sub-model, and engine information; e.g., as shown in vehicle information 510 of FIG. 5A. The repair information can describe one or more fixes (repairs) performed on the vehicle under repair.

For example, electronic authoring tool software 110 can determine one or more templates related to the complaint input, the vehicle information data, and/or the repair information, where the complaint input, the vehicle information data, and/or the repair information can be entered using a user interface provided by electronic authoring tool software 110, such as user interface 310 discussed above in the context of FIGS. 3A-3D or user interface 410 discussed above in the context of FIGS. 4A-4D. In some cases, electronic authoring tool software 110 can receive inputs for the complaint input, the vehicle information data, and/or the repair information, perhaps after providing selections for entry of the complaint input, the vehicle information data, and/or the repair information such as discussed above in the context of FIGS. 3A-4D, where the selections can be provided based on the determined template(s). Then, the template(s) can be used to determine attributes related to the complaint input, the vehicle information data, and/or the repair information, and the template(s) and/or attributes can be used to modify the complaint input, the vehicle information data, and/or the repair information.

At block 532, electronic authoring tool software 110 can generate and/or write vehicle information of a repair order (e.g., vehicle information 510 of repair order 500) based on vehicle information data and one or more templates. For example, electronic authoring tool software 110 can receive inputs related to vehicle information, perhaps after prompting for entry of the vehicle information and/or receiving displayed selections related to the vehicle information, such as discussed above in the context of FIGS. 3A-4D.

Then, electronic authoring tool software 110 can format and generate the vehicle information using the one or more templates. The one or more templates can be determined using one or more components of electronic authoring tool software 110; e.g., ontology/taxonomy logic 112, operating on one or more ontologies 140. For example, ontology/taxonomy logic 112 can obtain one or more templates related to repair order 500 specified in one or more ontologies 140. The one or more templates can refer to one or more attributes, including predetermined attributes and variable attributes, specified in one or more taxonomies 142. The template(s) and/or attribute(s) can be obtained using one or more selectors, such as selectors 120, 122, 124, 126, 128, 130, 132, and/or 134. After generating the vehicle information, electronic authoring tool software 110 can create and/or update repair order 500 to include the generated vehicle information. In particular, electronic authoring tool software 110 can perform some or all of the procedures related to formatting, generation, updating, and creating vehicle information and/or a repair order using repair order display generator 160.

At block 534, electronic authoring tool software 110 can match attributes related to a diagnosis of a repair order (e.g., diagnosis 512 of repair order 500). For example, electronic authoring tool software 110 can attempt to match attributes related to the repair order with words and/or other information in the input complaint input, the vehicle information data, and/or the repair information (that is, the input provided at block 530) using ontology/taxonomy logic 112 and/or one or more selectors 120-134, where the words are related to a repair indicated in the diagnosis.

At block 536, electronic authoring tool software 110 can generate and/or write a diagnosis, such as diagnosis 512 of repair order 500, using the matched attributes and/or the one or more templates of block 534. In some embodiments, input provided at block 530 (e.g., the complaint input, vehicle information data, and/or repair information) can include information that can be used to generate and/or write the diagnosis without modification of the input.

In other embodiments, the input provided at block 530 can be modified to provide the diagnosis. For example, electronic authoring tool software 110 can modify the input provided at block 530 using the matched attributes and/or the one or more templates of block 534; e.g., attributes and/or templates that match terms of the input provided at block 530. Then, the diagnosis can be generated based on the modified input. After generating the diagnosis, electronic authoring tool software 110 can create, write to, and/or update repair order 500 to include the generated diagnosis. In particular, electronic authoring tool software 110 can perform some or all of the procedures related to formatting, generation, updating, and creating a diagnosis and/or a repair order using repair order display generator 160.

At block 538, electronic authoring tool software 110 can determine parts and labor information for a repair order (e.g., parts and labor information 514 of repair order 500) based on component input, vehicle information data, and/or repair information (that is, the input received at block 530) related to parts and/or labor used to fix the vehicle under repair. For example, the component input, and perhaps other input received at block 530, can include part and/or labor information that electronic authoring tool software 110 can use to determine the parts and labor information. The part information can include, but is not limited to, part cost information, part naming information, estimated labor cost information, related part information, and other part-related information. The labor information can include, but is not limited to, a number of hours worked, a billing rate, a labor cost, and other labor-related information.

At block 540, electronic authoring tool software 110 can generate and/or write parts and labor information of a repair order (e.g., parts and labor information 514 of repair order 500) based on the parts and labor information determined at block 538 and one or more templates, such as template(s) related to a repair order. For example, electronic authoring tool software 110 can create and/or update repair order 500 to include the parts and labor information, where the parts and labor information are included in repair order 500 as indicated by the template(s) related to the repair order. After creating and/or updating repair order 500 to include the parts and labor information, electronic authoring tool software 110 can write, display, and/or otherwise communicate repair order 500. In particular, electronic authoring tool software 110 can perform some or all of the procedures related to formatting, generation, updating, and creating parts and labor information and/or a repair order using repair order display generator 160. Upon completion of block 540, method 520 can be completed.

FIG. 5C depicts an example view of a user interface of computing device 100 used for displaying repair order 500a, in accordance with an embodiment. For example, the user interface for repair order 500a can be provided by electronic authoring tool software 110 utilizing at least repair order display generator 160. Repair order 500a includes vehicle information 510a, diagnosis 512a, parts and labor information 514a, commonly replaced parts graph 516, and additional replaced parts graph 518.

Vehicle information 510a can include data about a vehicle under repair, such as discussed above in the context of vehicle information 510 of FIG. 5A. Diagnosis 512a can include information related to a diagnosis of the vehicle under repair, including, but not limited to, complaint information, cause information, and/or repair information, such as discussed above in the context of diagnosis 512 of FIG. 5A. Parts and labor information 514a can include information about parts and/or labor used to fix the vehicle under repair, such as discussed above in the context of parts and labor information 514 of FIG. 5A.

Commonly replaced parts graph 516 can provide information about one or more parts often replaced on other vehicles sharing a complaint and/or cause such as shown in diagnosis 512a and/or replaced when one or more parts such as shown in parts and labor 514a are also replaced. For example, commonly replaced parts graph 516 can provide information about one or more parts replaced for a complaint that "the check engine light is on", a cause related to "code P0401", or when an "Exhaust Gas Recirculation Valve" having part number "18011-P8A-AD0" is replaced as shown in diagnosis 512a and parts and labor 514a.

FIG. 5C illustrates that commonly replaced parts graph 516 is a graph with vehicle mileages ranging from 0 to 200,000 miles on the x-axis (shown with values ranging from 0 k to 200 k) and likelihoods of replacement (expressed as percentages) on the y-axis. Commonly replaced parts graph 516 shows that the most likely replaced part is an "EGRV" or exhaust gas recirculation valve and that other less-likely replaced parts include an "EGR" or exhaust gas recirculation "port sleeve", an "Intake gasket" and a partially named part "Intake ma . . . ."

Additional replaced parts graph 518 can provide information about one or more parts also replaced on other vehicles when one or more parts shown in parts and labor 514a have been replaced. For example, additional replaced parts graph 518 can provide information about one or more parts also replaced when an "Exhaust Gas Recirculation Valve" having part number "18011-P8A-D0" is replaced as shown in parts and labor 514a, or perhaps mentioned in diagnosis 512a.

FIG. 5C illustrates that additional replaced parts graph 518 is a dot graph, where each dot represents a possible additionally replaced part and a size of a dot corresponds to a likelihood that the part represented by the dot was additionally replaced. In the example shown in FIG. 5C, additional replaced parts graph 518 includes three dots: a black dot representing an intake gasket, a relatively-dark gray dot representing an exhaust gas recirculation port sleeve, and a relatively light-gray dot representing a throttle body gasket. The three dots correspond to parts that may be additionally replaced when an exhaust gas recirculation valve is replaced. The black dot is shown as a relatively large dot in FIG. 5C to illustrate the relatively-high likelihood of "60%" that an "intake gasket" will be additionally replaced when an exhaust gas recirculation valve is replaced; the relatively-dark gray dot is shown as a medium-sized dot in FIG. 5C to illustrate the medium likelihood of "25%" that an "EGR Port Sleeve" will be additionally replaced when an exhaust gas recirculation valve is replaced, and the relatively-light gray dot is shown as a relatively small dot in FIG. 5C to illustrate the relatively-small likelihood of "15%" that a "Throttle Body Gasket" will be additionally replaced when an exhaust gas recirculation valve is replaced. In other examples, more, less, and/or different information can be provided by graph 516 and/or graph 518.

Figure 5D:
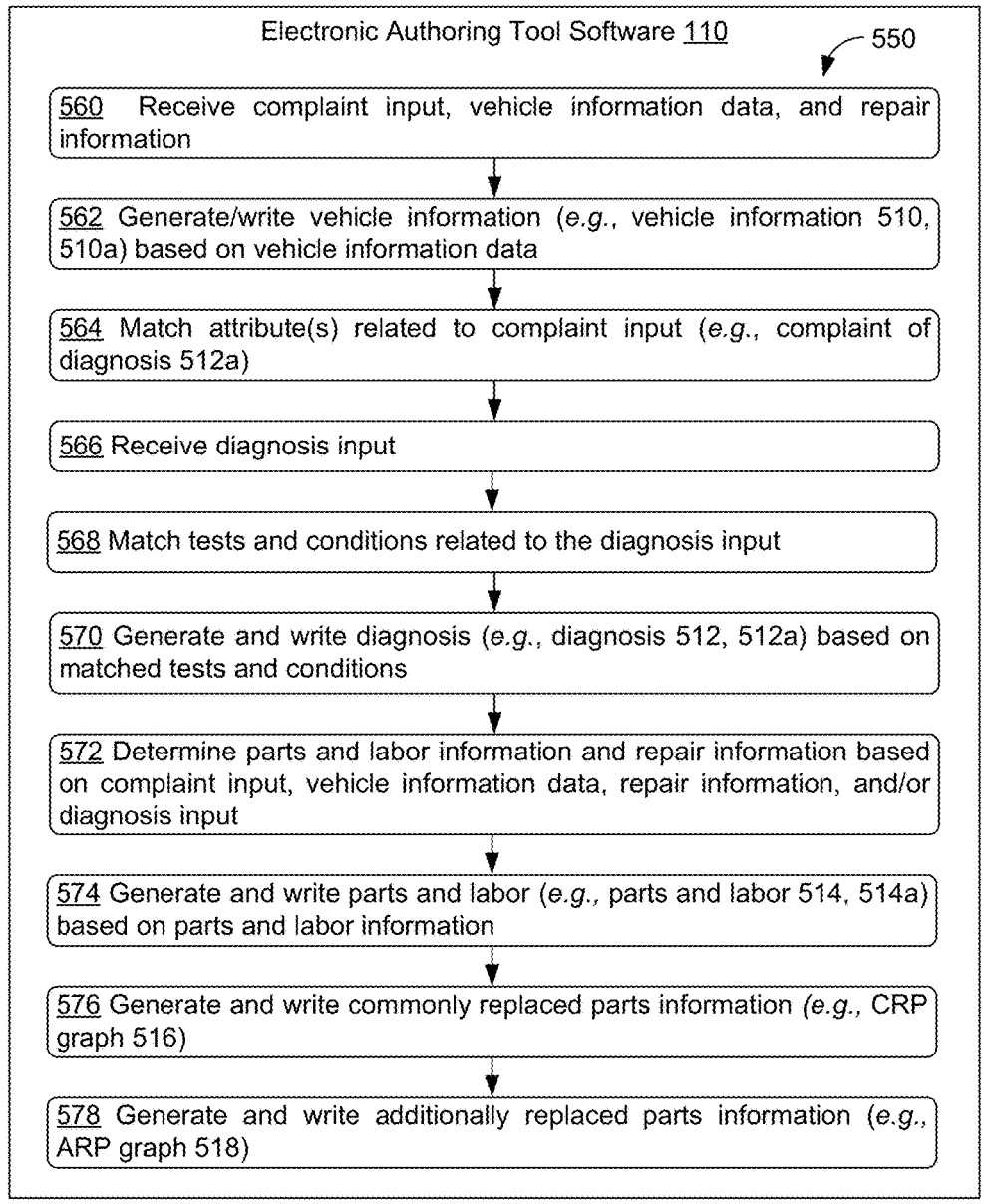
FIG. 5D depicts a flowchart for electronic authoring tool software related to the user interface depicted by FIG. 5C, in accordance with an embodiment.

FIG. 5D depicts a flowchart for electronic authoring tool software 110 related to the user interface depicted by FIG. 5C, in accordance with an embodiment. The flowchart illustrates method 550 that can be performed by electronic authoring tool software 110 to generate a repair order, such as repair order 500a shown in FIG. 5C.

As indicated in FIG. 5D, method 550 can begin at block 560 where electronic authoring tool software 110 can receive complaint input, vehicle information data, and/or repair information, such as discussed above in the context of block 530 of method 520. In some embodiments, at block 560 electronic authoring tool software 110 additionally can determine one or more templates and/or attributes related to the received complaint input, vehicle information data, and/or repair information.

At block 562, electronic authoring tool software 110 can generate and/or write a vehicle information component of a repair order (e.g., vehicle information 510 of repair order 500 or vehicle information 510*a* of repair order 500*a*) based on vehicle information data and one or more templates, such as discussed above in the context of block 532 of method 520. If the repair order has not yet been generated, electronic authoring tool software 110 can generate the repair order and then write the vehicle information to the repair order.

At block 564, electronic authoring tool software 110 can match attributes related to a complaint in a diagnosis of a repair order (e.g., diagnosis 512 of repair order 500 or diagnosis 512*a* of repair order 500*a*). For example, electronic authoring tool software 110 can attempt to match attributes related to the complaints with words and/or other information in the complaint input, the vehicle information data, and/or the repair information (that is, the input received at block 560) using ontology/taxonomy logic 112 and/or one or more selectors 120-134, where the words are related to the complaint of the diagnosis. The matched attributes can then be used to format and/or generate a complaint in the diagnosis.

At block 566, electronic authoring tool software 110 can receive diagnosis input. The diagnosis input can include cause input and/or component input for components under repair. Electronic authoring tool software 110 can determine one or more templates related to the diagnosis input, where the diagnosis input can be entered using a user interface provided by electronic authoring tool software 110, such as user interface 310 discussed above in the context of FIGS. 3A-3D, user interface 410 discussed above in the context of FIGS. 4A-4D, and/or the complaint input, the vehicle information data, and/or the repair information discussed above in the context of blocks 530 and 560. In some embodiments, the diagnosis input can be received at block 560; e.g., as at least part of the repair information.

At block 568, electronic authoring tool software 110 can match tests and conditions related to the diagnosis input and perhaps other inputs. For example, the diagnosis input provided at block 566 can include information about tests used to diagnose one or more complaints; e.g, complaint(s) provided in the complaint input and/or can include information about conditions of a vehicle under repair that are related to diagnosing the one or more complaints. Then, these tests and conditions can be matched to one or more templates, one or more attributes, test-and-condition-related input in the complaint input, the vehicle information data, and/or the repair information (that is, the input received at block 560), and/or can be matched to other data, such as information provided by computing device 100 and/or other computing devices about repair techniques, tests, and/or conditions related to the one or more complaints.

At block 570, electronic authoring tool software 110 can generate and/or write a diagnosis component, such as diagnosis 512 of repair order 500 or diagnosis 512*a* of repair order 500*a*, to the repair order using the matched attributes and/or the one or more templates of block 566 and/or the matched tests and conditions of block 568. If the repair order has not yet been generated, electronic authoring tool software 110 can generate the repair order and then write at least the diagnosis component to the repair order.

In some embodiments, the diagnosis component can also include a repair, such as the repair in diagnosis 512 of repair order 500—in these embodiments, electronic authoring tool software 110 can generate and/or write the repair of the diagnosis component based on the inputs provide at block 560; e.g., the repair information.

In other embodiments, the input provided at block 560 (e.g., the complaint input, vehicle information data, and/or repair information) and/or block 566 (e.g., the diagnosis input) can include information that can be used to generate and/or write the diagnosis component without modification of the input. In other embodiments, the input provided at blocks 560 and/or 566 can be modified to provide the diagnosis component. For example, electronic authoring tool software 110 can modify the input provided at blocks 560 and/or 566 based on the matched attributes and/or the one or more templates of block 564 that match terms of the input provided at block 560 and/or the matched tests and conditions of block 568 that match the input provided at blocks 560 and/or 566. Then, the diagnosis component can be generated based on the modified input. After generating the diagnosis component, electronic authoring tool software 110 can create and/or update repair order 500*a* to include the generated diagnosis component.

In still other embodiments, electronic authoring tool software 110 can perform some or all of the procedures related to formatting, generation, updating, and creating the diagnosis component and/or the repair order using repair order display generator 160.

At block 572, electronic authoring tool software 110 can determine parts and labor information and repair information based on complaint input, vehicle information data, repair information, and/or diagnosis input; that is, the input provided at blocks 560 and/or 566. For example, the component input, and perhaps other input received at blocks 560 and/or 566, can include part information and/or labor information that electronic authoring tool software 110 can use to determine the parts and labor information. Part information and the labor information are discussed above in the context of block 538.

At block 574, electronic authoring tool software 110 can generate and/or write a parts and labor information component (e.g., parts and labor information 514 of repair order 500 or parts and repair information 514*a* of repair order 500*a*) to the repair order based on the parts and labor information determined at block 572 and one or more templates, such as template(s) related to a repair order. If the repair order has not yet been generated, electronic authoring tool software 110 can generate the repair order and then write at least the parts and labor component to the repair order. Electronic authoring tool software 110 create and/or update repair order 500 to include the parts and labor information component as indicated by the template(s) related to the repair order. In particular, electronic authoring tool software 110 can perform some or all of the procedures related to formatting, generation, updating, and creating the parts and labor information component and/or the repair order using repair order display generator 160.

At block 576, electronic authoring tool software 110 can generate and write commonly replaced parts information (e.g., CRP graph 516 of repair order 500*a*) to the repair order. If the repair order has not yet been generated, electronic authoring tool software 110 can generate the repair order and then write at least the commonly replaced parts information to the repair order.

In some embodiments, the commonly replaced parts information can be determined based on the parts and labor information determined at block 572. For example, for one or more parts indicated in the parts and labor information, electronic authoring tool software 110 can obtain information about commonly replaced parts related to the one or more parts indicated in the parts and labor information. As a particular example, electronic authoring tool software 110 can obtain information about commonly replaced parts by querying a database of commonly replaced parts; e.g., generating and sending a query to the database, where the query requests information for commonly replaced parts related to the one or more parts, and receiving a query result with the requested commonly replaced parts information from the database. The database of commonly replaced parts can be resident on computing device 100 and/or remotely resident and accessible to computing device 100. In other particular examples, other techniques than querying a database can be used to obtain the commonly replaced parts information. In other embodiments, commonly replaced parts information can be obtained based on the input provided at blocks 560 and 566.

After obtaining the commonly replaced parts information, electronic authoring tool software 110 can generate a CRP graph or other representation(s) of the commonly replaced parts information based on the one or more templates. For example, the template(s) can include one or more imagery attributes 264 to specify one or more techniques to specify, describe, and/or display the commonly replaced parts information as the CRP graph. As another example, the template(s) can include information for a textual-based representation, such as a table or list, of the commonly replaced parts information. Then, the generated CRP graph or other representation(s) of the commonly replaced parts information can be written to the repair order. In particular, electronic authoring tool software 110 can perform some or all of the procedures related to formatting, generation, updating, and creating commonly replaced parts information and/or a repair order using repair order display generator 160.

At block 578, electronic authoring tool software 110 can generate and write additionally replaced parts information (e.g., ARP graph 518) to the repair order (e.g., repair order 500*a*). If the repair order has not yet been generated, electronic authoring tool software 110 can generate the repair order and then write at least the additionally replaced parts information to the repair order.

In some embodiments, the additionally replaced parts information can be determined, based on the parts and labor information determined at block 572. For example, for one or more parts indicated in the parts and labor information, electronic authoring tool software 110 can obtain information about additionally replaced parts related to the one or more parts indicated in the parts and labor information. As a particular example, electronic authoring tool software 110 can obtain information about additionally replaced parts by querying a database of additionally replaced parts; e.g., generating and sending a query to the database, where the query requests information for additionally replaced parts related to the one or more parts, and receiving a query result with the requested additionally replaced parts information from the database.

The database of additionally replaced parts can be resident on computing device 100 and/or remotely resident and accessible to computing device 100. In a more particular example, the database of commonly replaced parts of block 576 and the database of additionally replaced parts can be combined into one database. In other particular examples, other techniques than querying a database can be used to obtain the additionally replaced parts information. In other embodiments, additionally replaced parts information can be obtained based on the input provided at blocks 560 and 566.

After obtaining the additionally replaced parts information, electronic authoring tool software 110 can generate an ARP graph or other representation(s) of the additionally replaced parts information based on the one or more templates, such as discussed above in the context of block 576. Then, the generated ARP graph or other representation(s) of the additionally replaced parts information can be written to the repair order. In particular, electronic authoring tool software 110 can perform some or all of the procedures related to formatting, generation, updating, and creating additionally replaced parts information and/or a repair order using repair order display generator 160.

Figure 6A:
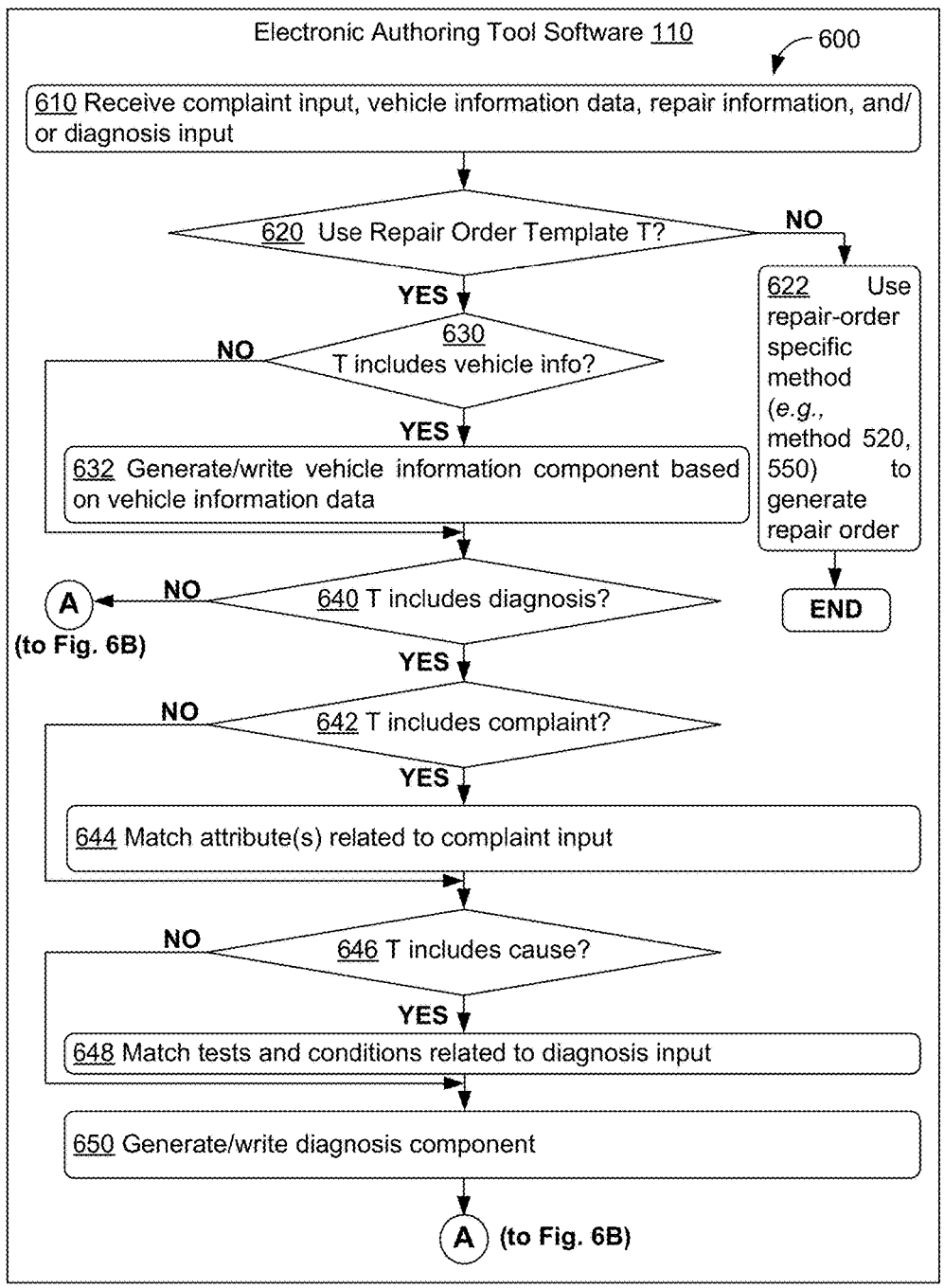
FIGS. 6A and 6B depict another flowchart for electronic authoring tool software related to the user interfaces depicted by FIGS. 5A and 5C, in accordance with an embodiment.
Figure 6B:
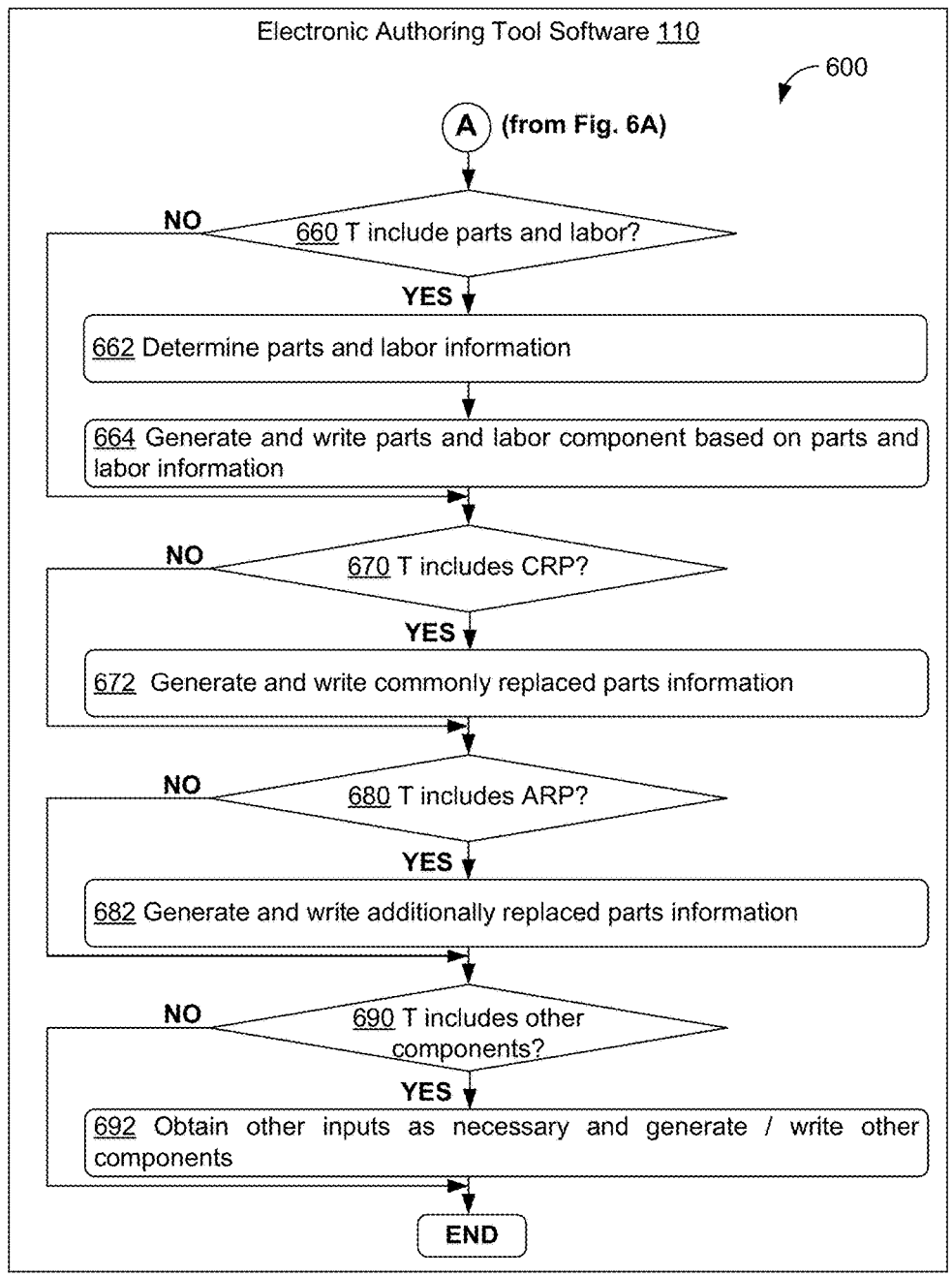

In some embodiments, after completing the generation and writing of the repair order, electronic authoring tool software 110 can write, display, and/or otherwise communicate the repair order. In other embodiments, method 550 can be completed upon completion of block 578, FIGS. 6A and 6B depict another flowchart for electronic authoring tool software 110 related to the user interfaces depicted by FIGS. 5A and 5C, in accordance with an embodiment. The flowchart of FIGS. 6A and 6B describes method 600 for generating repair orders using a repair order template T that specifies components of the repair order, such as vehicle information, complaints, diagnoses, additionally replaced parts information, and commonly replaced parts information and/or other information, such as layout information, about the repair order.

Method 600 begins at block 610, where electronic authoring tool software 110 can receive complaint input, vehicle information data, repair information, and/or diagnosis input, such as discussed above in the context of blocks 560 and 566 of method 550.

At block 620, electronic authoring tool software 110 can determine whether repair order template T is to be used to generate the repair order. The determination whether repair order template T is to be used to generate the repair order can be based on a first input that can indicate whether a template is to be used, a second input either specifying template T or not specifying template T, and/or based on other inputs and/or rationales.

If electronic authoring tool software 110 determines that repair order template T is not to be used to generate the repair order, then electronic authoring tool software 110 can proceed to block 622. If electronic authoring tool software 110 determines that repair order template T is to be used to generate the repair order, then electronic authoring tool software 110 can proceed to block 630.

At block 622, electronic authoring tool software 110 has determined that repair order template T is not to be used to generate the repair order, and so can use a repair-order specific method, such as method 520 or 550, to generate the repair order. Upon completion of block 622, method 600 can end.

At block 630, electronic authoring tool software 110 has determined that repair order template T is to be used to generate the repair order. Then, electronic authoring tool software 110 can examine template T to determine whether template T specifies that the repair order should include a vehicle information component, such as vehicle information 510 of repair order 500 or vehicle information 510*a* of repair order 500*a*.

If electronic authoring tool software 110 determines that template T specifies inclusion of the vehicle information component, then electronic authoring tool software 110 can proceed to block 632. If electronic authoring tool software 110 determines that template T does not specify inclusion of the vehicle information component, then electronic authoring tool software 110 can proceed to block 640.

At block 632, electronic authoring tool software 110 can write the vehicle information component of the repair order using the techniques of block 562 of method 500.

At block 640, electronic authoring tool software 110 can examine template T to determine whether template T specifies that the repair order should include a diagnosis component, such as diagnosis 512 of repair order 500 or diagnosis 512a of repair order 500a. If electronic authoring tool software 110 determines that template T specifies inclusion of the diagnosis component, then electronic authoring tool software 110 can proceed to block 642. If electronic authoring tool software 110 determines that template T does not specify inclusion of the diagnosis component, then electronic authoring tool software 110 can proceed to block 660.

At block 642, electronic authoring tool software 110 can examine template T to determine whether template T specifies that the repair order should include a complaint as part of the diagnosis component, such as the complaints shown in diagnosis 512 of repair order 500 and shown in diagnosis 512a of repair order 500a. If electronic authoring tool software 110 determines that template T specifies inclusion of the complaint, then electronic authoring tool software 110 can proceed to block 644. If electronic authoring tool software 110 determines that template T does not specify inclusion of the complaint, then electronic authoring tool software 110 can proceed to block 646.

At block 644, electronic authoring tool software 110 can match attributes related to a complaint in a diagnosis of a repair order to the input received at block 610. The matching can be performed using the techniques of block 564 of method 550.

At block 646, electronic authoring tool software 110 can examine template T to determine whether template T specifies that the repair order should include a cause as part of the diagnosis component, such as the cause shown in diagnosis 512a of repair order 500a. If electronic authoring tool software 110 determines that template T specifies inclusion of the cause, then electronic authoring tool software 110 can proceed to block 648. If electronic authoring tool software 110 determines that template T does not specify inclusion of the cause, then electronic authoring tool software 110 can proceed to block 650.

At block 648, electronic authoring tool software 110 can match tests and conditions related to the diagnosis input and perhaps other inputs using the techniques of block 568 of method 550.

At block 650, electronic authoring tool software 110 can generate the diagnosis component and write the diagnosis component to the repair order using the techniques of block 570. In some embodiments not shown in FIG. 6A, electronic authoring tool software 110 can examine template T to determine whether template T specifies that the repair order should include a repair as part of the diagnosis component, such as the repair shown in diagnosis 512 of repair order 500. In these embodiments, if template T specifies that the repair order should include the repair as part of the diagnosis component, then electronic authoring tool software 110 can generate a repair as part of the diagnosis component using the techniques of block 570.

After completing the procedures of block 650, electronic authoring tool software 110 can proceed to block 660, which is shown in FIG. 6B.

At block 660, electronic authoring tool software 110 can examine template T to determine whether template T specifies that the repair order should include a parts and labor component, such as parts and labor information 514 of repair order 500 or parts and repair information 514a of repair order 500a. If electronic authoring tool software 110 determines that template T specifies inclusion of the parts and labor component, then electronic authoring tool software 110 can proceed to block 662. If electronic authoring tool software 110 determines that template T does not specify inclusion of the parts and labor component, then electronic authoring tool software 110 can proceed to block 670.

At block 662, electronic authoring tool software 110 can determine parts and labor information using the techniques of block 572 of method 500.

At block 664, electronic authoring tool software 110 can generate and/or write the parts and labor information component to the repair order based on the parts and labor information determined at block 662. The parts and labor information component can be generated and/or written using the techniques of block 574 of method 500.

At block 670, electronic authoring tool software 110 can examine template T to determine whether template T specifies that the repair order should include commonly replaced parts information, such as CRP graph 516 of repair order 500a. If electronic authoring tool software 110 determines that template T specifies inclusion of the commonly replaced parts information, then electronic authoring tool software 110 can proceed to block 672. If electronic authoring tool software 110 determines that template T does not specify inclusion of the commonly replaced parts information, then electronic authoring tool software 110 can proceed to block 680.

At block 672, electronic authoring tool software 110 can generate and write the commonly replaced parts information using the techniques of block 576 of method 550. In some embodiments, electronic authoring tool software 110 can determine parts and labor information using the techniques of block 572 of method 500 and then use the parts and labor information to generate the commonly replaced parts information using the techniques of block 576 of method 550.

At block 680, electronic authoring tool software 110 can examine template T to determine whether template T specifies that the repair order should include additionally replaced parts information, such as ARP graph 518 of repair order 500a. If electronic authoring tool software 110 determines that template T specifies inclusion of the additionally replaced parts information, then electronic authoring tool software 110 can proceed to block 682. If electronic authoring tool software 110 determines that template T does not specify inclusion of the additionally replaced parts information, then electronic authoring tool software 110 can proceed to block 690.

At block 682, electronic authoring tool software 110 can generate and write the additionally replaced parts information using the techniques of block 578 of method 550. In some embodiments, electronic authoring tool software 110 can determine parts and labor information using the techniques of block 572 of method 500 and then use the parts and labor information to generate the additionally replaced parts information using the techniques of block 578 of method 550.

At block 690, electronic authoring tool software 110 can examine template T to determine whether template T specifies that the repair order should include other components. If electronic authoring tool software 110 determines that template T specifies inclusion of the other components, then electronic authoring tool software 110 can proceed to block 692. If electronic authoring tool software 110 determines that template T does not specify inclusion of the other components, then electronic authoring tool software 110 can complete the generation and writing of the repair order. Upon completion of block 690, method 600 can be completed.

At block 692, electronic authoring tool software 110 can obtain any other input necessary for the other components specified in template T. For example, the repair order can be associated with a previously-generated repair order; i.e., the repair order is a callback repair to address complaints with a previously-repaired vehicle. In this example, template T can include one or more other components to specify inclusion of an output including at least part of the previously-generated repair order and at least part of the vehicular repair order. Additional other components are possible as well. The input can be processed to generate the other components and the other components can be written to the repair order. If the repair order has not been generated previously, the repair order can be generated and then the other components can be written to the repair order. Then, electronic authoring tool software 110 can complete the generation and writing of the repair order. Upon completion of block 692, method 600 can be completed.

In some embodiments, after generating and writing the repair order using method 600, electronic authoring tool software 110 can write, display, and/or otherwise communicate the repair order.

Example Computing Network

Figure 7:
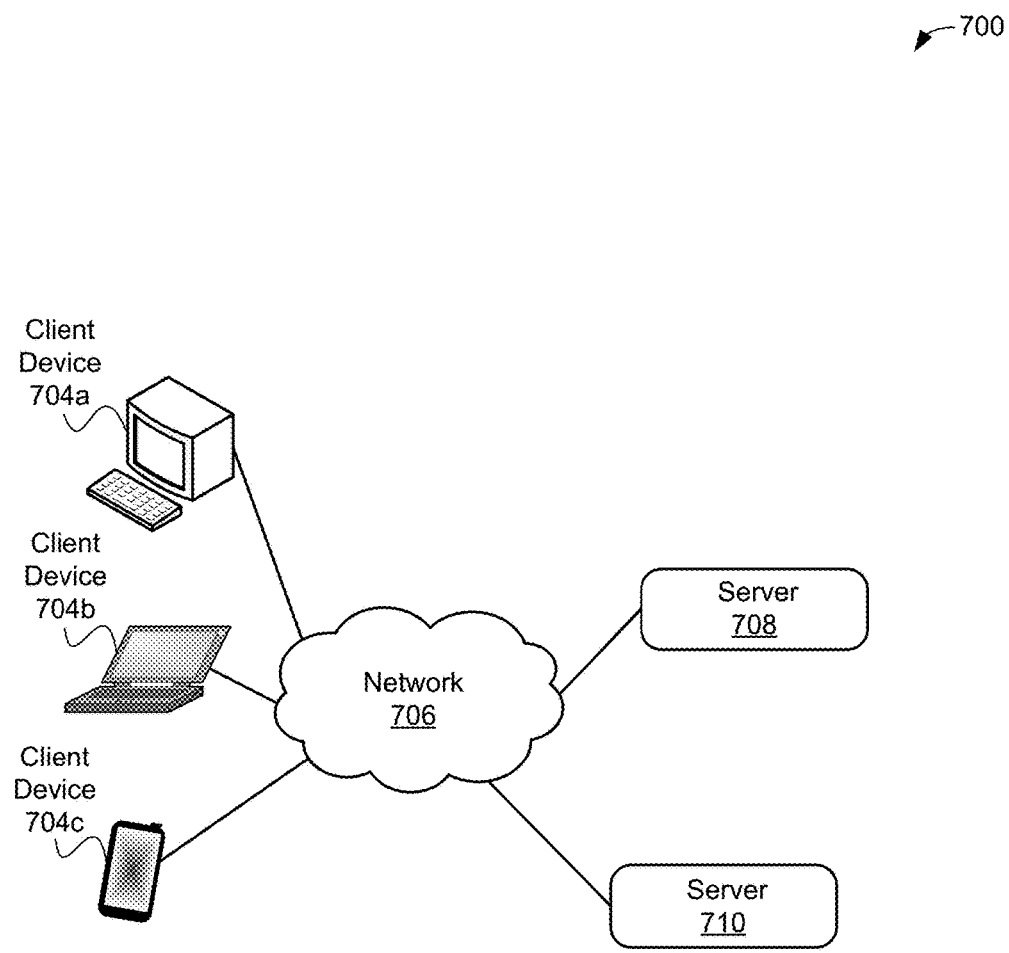
FIG. 7 is a block diagram of an example computing network, in accordance with an embodiment.

FIG. 7 is a block diagram of example computing network 700 in accordance with an example embodiment. In FIG. 7, servers 708 and 710 are configured to communicate, via a network 706 as well as with client devices 704a, 704b, and 704c. As shown in FIG. 7, client devices may include a personal computer 704a, a laptop computer 704b, and a smart-phone 704c. More generally, client devices 704a-704c (or any additional client devices) may be any sort of computing device, such as a workstation, network terminal, desktop computer, laptop computer, wireless communication device (e.g., a cell phone, smart phone (such as an IPHONE® smartphone from Apple Inc. of Cupertino, Calif., or a GALAXY S® smartphone from Samsung Electronics Co., Ltd. of Maetan-Dong, Yeongtong-Gu Suwon-Si, Gyeonggi-Do, Republic of Korea), or tablet device (such as an IPAD® tablet device from Apple Inc., or a SAMSUNG GALAXY TAB tablet device from Samsung Electronics Co., Ltd.)), and so on.

Network 706 may correspond to a local area network, a wide area network, a corporate intranet, the public Internet, combinations thereof, or any other type of network(s) configured to provide communication between networked computing devices. In some embodiments, part or all of the communication between networked computing devices may be secured. Servers 708 and 710 may share content with and/or provide content to client devices 704a-704c. As shown in FIG. 7, servers 708 and 710 are not physically at the same location. Alternatively, some or all of servers 708 and 710 may be co-located, and/or may be accessible via one or more networks separate from network 706. Although FIG. 7 shows three client devices and two servers, network 706 may service more or fewer client devices and/or more or fewer servers. In some embodiments, one or more of servers 708, 710 may perform some or all of the functionality related to the herein-described methods and/or scenarios; e.g., the examples discussed above in the context of user interface 310, the examples discussed above in the context of user interface 410, and methods 520, 550, 600, and 900.

Example Computing Device

Figure 8A:
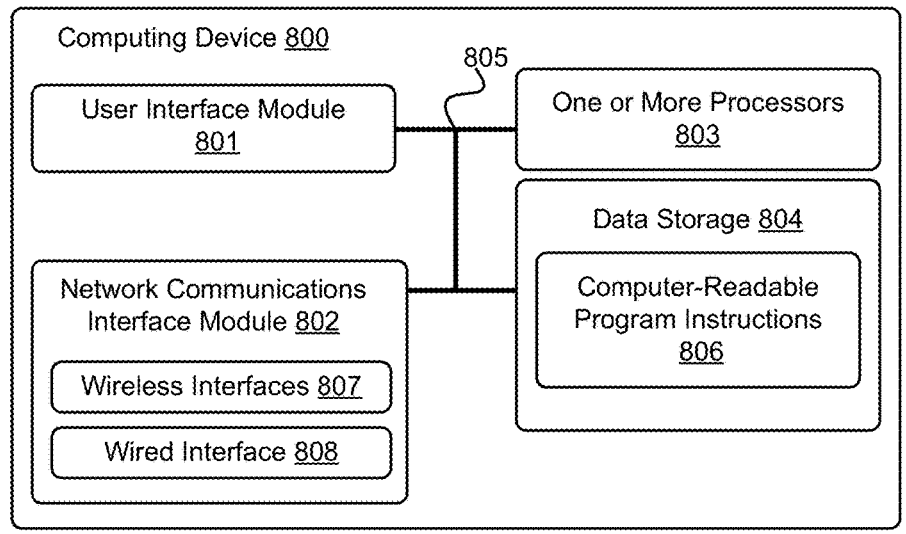
FIG. 8A is a block diagram of an example computing device, in accordance with an embodiment.

FIG. 8A is a block diagram of an example computing device 800 that may include a user interface module 801, a network communication interface module 802, one or more processors 803, and data storage 804, all of which may be linked together via a system bus, network, or other connection mechanism 805.

In particular, computing device 800 shown in FIG. 8A may be configured to perform one or more functions of computing device 100, electronic authoring tool software 110, ontology/taxonomy logic 112, system selector 120, symptom selector 122, condition selector 124, description selector 126, speed selector 128, spatial selector 130, imagery selector 132, audio selector 134, ontology/ontologies 140, 140a, 140b, 140c, 140d, 140e, 140f, taxonomy/taxonomies 142, 142a, 142b, 142c, 142d, 142e, component selector 150, test result selector 152, repair order display generator 160, user interface 310 and examples thereof, user interface 410 and examples thereof, repair orders 500, 500a, and methods 520, 550, 600, and 900.

Computing device 800 may be a desktop computer, laptop or notebook computer, personal data assistant (PDA), mobile phone, embedded processor, touch-enabled device, or any similar device that is equipped with at least one processing unit capable of executing machine-language instructions that implement at least part of the herein-described techniques and methods, including, but not limited to, the examples discussed above in the context of user interface 310, the examples discussed above in the context of user interface 410, and methods 520, 550, 600, and 900.

User interface module 801 may receive input and/or provide output, perhaps to a user. User interface module 801 may be configured to send and/or receive data to and/or from user input from input device(s), such as a keyboard, a keypad, a touch screen, a computer mouse, a track ball, a joystick, and/or other similar devices configured to receive input from a user of the computing device 800.

User interface module 801 may be configured to provide output to output display devices, such as one or more cathode ray tubes (CRTs), liquid crystal displays (LCDs), plasma devices, light emitting diodes (LEDs), displays using digital light processing (DLP) technology, printers, light bulbs, and/or other similar devices capable of displaying graphical, textual, and/or numerical information to a user of computing device 800. User interface module 801 may also be configured to generate audible output(s), such as a speaker, speaker jack, audio output port, audio output device, earphones, and/or other similar devices configured to convey sound and/or audible information to a user of computing device 800.

Network communication interface module 802 may be configured to send and receive data over wireless interface 807 and/or wired interface 808 via a network, such as network 706. Wireless interface 807 if present, may use an air interface, such as a Bluetooth®, ZigBee®, and/or WiMAX™ interface to a data network, such as a wide area network (WAN), a local area network (LAN), one or more public data networks (e.g., the Internet), one or more private data networks, or any combination of public and private data networks. Wired interface(s) 808, if present, may comprise a wire, cable, fiber-optic link and/or similar physical connection(s) to a data network, such as a WAN, LAN, one or more public data networks, one or more private data networks, or any combination of such networks.

In some embodiments, network communication interface module 802 may be configured to provide reliable, secured, and/or authenticated communications. For each communication described herein, information for ensuring reliable communications (i.e., guaranteed message delivery) may be provided, perhaps as part of a message header and/or footer (e.g., packet/message sequencing information, encapsulation header(s) and/or footer(s), size/time information, and transmission verification information such as CRC and/or parity check values). Communications may be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well as or in addition to those listed herein to secure (and then decrypt/decode) communications.

Processor(s) 803 may include one or more central processing units, computer processors, mobile processors, digital signal processors (DSPs), graphics processing units (GPUs), microprocessors, computer chips, and/or other processing units configured to execute machine-language instructions and process data. Processor(s) 803 may be configured to execute computer-readable program instructions 806 that are contained in data storage 804 and/or other instructions as described herein.

Data storage 804 may include one or more physical and/or non-transitory storage devices, such as read-only memory (ROM), random access memory (RAM), removable-disk-drive memory, hard-disk memory, magnetic-tape memory, flash memory, and/or other storage devices. Data storage 804 may include one or more physical and/or non-transitory storage devices with at least enough combined storage capacity to contain computer-readable program instructions 806 and any associated/related data and data structures.

Computer-readable program instructions 806 and any data structures contained in data storage 806 include computer-readable program instructions executable by processor(s) 803 and any storage required, respectively, to perform at least part of herein-described methods and/or scenarios; e.g., the examples discussed above in the context of user interface 310, the examples discussed above in the context of user interface 410, and methods 520, 550, 600, and 900.

Figure 8B:
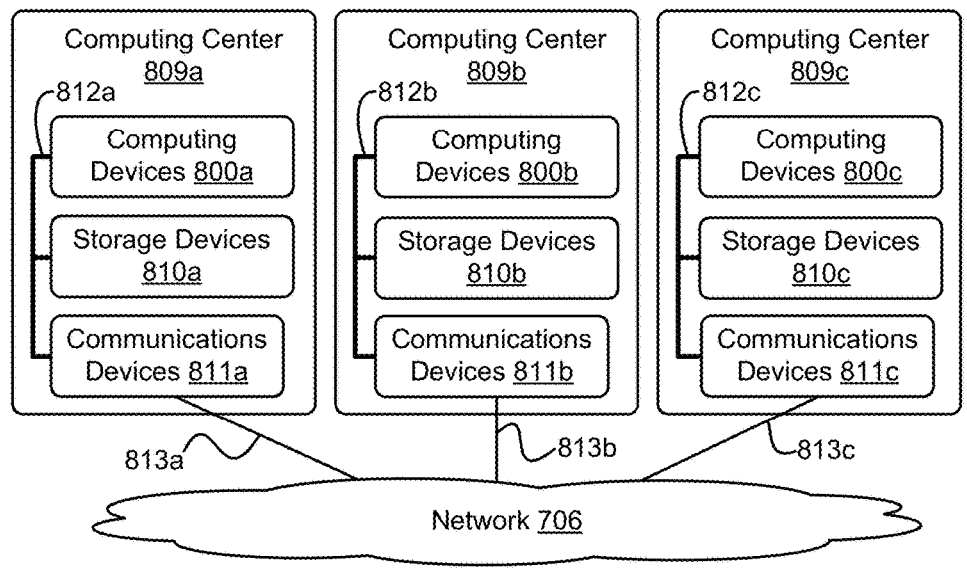
FIG. 8B depicts an example network of computing centers, in accordance with an embodiment.

FIG. 8B depicts a network 706 of computing centers 809*a*, 809*b*, 809*c* in accordance with an example embodiment. Data and/or software for computing device 100 and/or electronic authoring tool software 110 may be stored on one or more cloud-based devices that store program logic and/or data of cloud-based applications and/or services. In some embodiments, electronic authoring tool software 110 may be on a single computing device residing in a single computing center. In other embodiments, electronic authoring tool software 110 may reside on multiple computing devices in a single computing center, or even multiple computing devices located in multiple computing centers located in diverse geographic locations.

In some embodiments, data and/or software for electronic authoring tool software 110 may be encoded as computer readable information stored in tangible computer readable media (or computer readable storage media) and accessible by client devices 704*a*, 704*b*, and 704*c*, and/or other computing devices (e.g., servers 708, 710). In some embodiments, data and/or software for electronic authoring tool software 110 may be stored on a single disk drive or other tangible storage media, or may be implemented on multiple disk drives or other tangible storage media located at one or more diverse geographic locations.

FIG. 8B depicts a cloud-based server system in accordance with an example embodiment. In FIG. 8B, the functions of electronic authoring tool software 110 may be distributed among three computing centers 809*a*, 809*b*, and 808*c*. Computing center 809*a* may include one or more computing devices 800*a*, storage devices 810*a*, and communication devices 811*a* (e.g., router(s), hub(s), switch(es) connected by local network 812*a*. Similarly, computing center 809*b* may include one or more computing devices 800*b*, storage devices 810*b*, and communication devices 811*b* connected by local network 812*b*. Likewise, computing center 809*c* may include one or more computing devices 800*c*, storage devices 810*c*, and communication devices 811*c* connected by local network 812*c*.

In some embodiments, each of computing centers 809*a*, 809*b*, and 809*c* may have equal numbers of computing, storage, and communication devices. In other embodiments, however, each computing center may have different numbers of computing, storage, and/or communication devices. The number of computing, storage, and communication devices in each computing center may depend on the computing task or tasks assigned to each computing center.

In computing center 809*a*, for example, computing devices 800*a* may be configured to perform various computing tasks of electronic authoring tool software 110. In one embodiment, the various functionalities of symptoms/components electronic authoring tool software 110 may be distributed among one or more of computing devices 800*a*, 800*b*, and 800*c*. Computing devices 800*b* and 800*c* in computing centers 809*b* and 809*c* may be configured similarly to computing devices 800*a* in computing center 809*a*. On the other hand, in some embodiments, computing devices 800*a*, 800*b*, and 800*c* may be configured to perform different functions.

In some embodiments, computing tasks and stored data associated with electronic authoring tool software 110 may be distributed across computing devices 800*a*, 800*b*, and 800*c* based at least in part on the processing requirements of electronic authoring tool software 110, the processing capabilities of computing devices 800*a*, 800*b*, and 800*c*, the latency of the network links between the computing devices in each computing center and between the computing centers themselves, and/or other factors that may contribute to the cost, speed, fault-tolerance, resiliency, efficiency, and/or other design goals of the overall system architecture.

The storage devices 810*a*, 810*b*, and 810*c* of computing centers 809*a*, 809*b*, and 809*c* may be data storage arrays that include disk array controllers configured to manage read and write access to groups of hard disk drives. The disk array controllers, alone or in conjunction with their respective computing devices, may also be configured to manage backup or redundant copies of the data stored in the storage devices to protect against disk drive or other storage device failures and/or network failures that prevent one or more computing devices from accessing one or more storage devices.

Similar to the manner in which the functions of electronic authoring tool software 110 may be distributed across computing devices 800*a*, 800*b*, and 800*c* of computing centers 809*a*, 809*b*, and 809*c*, various active portions and/or backup portions of these components may be distributed across storage devices 810*a*, 810*b*, and 810*c*. For example, some storage devices may be configured to store one portion of the data and/or software of electronic authoring tool software 110, while other storage devices may store other, separate portions of the data and/or software of electronic authoring tool software 110. Additionally, some storage devices may be configured to store backup versions of data and/or software stored in other storage devices.

Communication devices 811*a*, 811*b*, and 811*c* may include networking equipment configured to provide internal and external communications for computing centers 809*a*, 809*b*, 809*c*. For example, communication devices

811*a* in computing center 809*a* may include one or more internet switching and routing devices configured to provide (i) local area network communications between computing devices 800*a* and storage devices 810*a* via local network 812*a*, and (ii) wide area network communications between computing center 809*a* and the computing facilities 809*b* and 809*c* via connection 813*a* to network 706. Communication devices 811*b* and 811*c* may include network equipment similar to communication devices 811*a*, and communication devices 811*b* and 811*c* may perform similar networking functions for computing centers 809*b* and 809*b* that communication devices 811*a* perform for computing center 809*a*.

In some embodiments, the configuration of communication devices 811*a*, 811*b*, and 811*c* may be based at least in part on the communication requirements of the computing devices and storage devices, the communications capabilities of network equipment in the communication devices 811*a*, 811*b*, and 811*c*, the latency and throughput of local networks 812*a*, 812*b*, 812*c*, the latency, throughput, and cost of connections 813*a*, 813*b*, and 813*c*, and/or other factors that may contribute to the cost, speed, throughput, fault-tolerance, resiliency, efficiency and/or other design goals for computing centers 809*a*, 809*b*, 809*c*.

Example Methods of Operation

Figure 9:
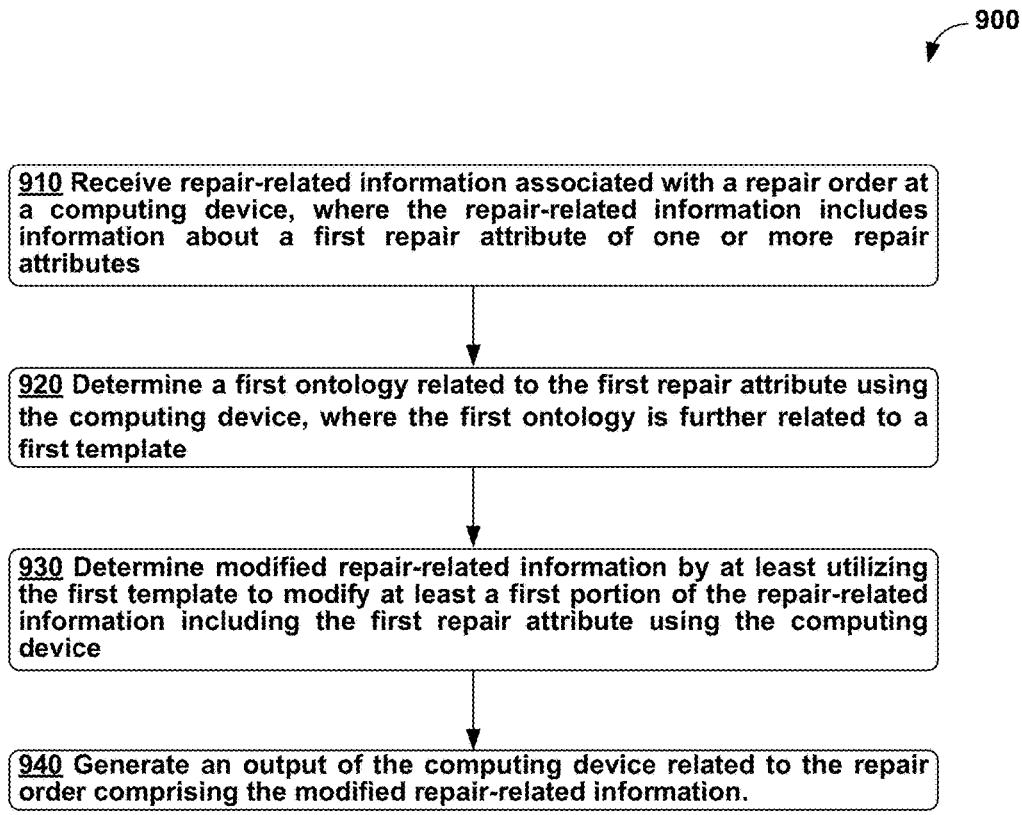
FIG. 9 is a flow chart of an example method, in accordance with an embodiment.

FIG. 9 is a flow chart of an example method 900, which can be used at least as a method for generating repair orders. Method 900 may be carried out by a computing device, such as computing device 800 discussed above in the context of FIG. 8A.

Method 900 may begin at block 910, where the computing device can receive repair-related information associated with a repair order at a computing device, where the repair-related information includes information about a first repair attribute of one or more repair attributes, as discussed above at least in the context of FIGS. 2A-6B.

In some embodiments, the repair order can include a vehicular repair order, the one or more repair attributes can include one or more vehicular-repair attributes, and the first repair attribute comprises a first vehicular-repair attribute of the one or more vehicular-repair attribute, as discussed above at least in the context of FIGS. 2A-6B. In particular of these embodiments, the one or more vehicular-repair attributes can include at least one of: a symptom-related attribute, an occurrence-related attribute, a spatially-related attribute, a system-related attribute, a speed-related attribute, a description-related attribute, an audio-related attribute, an imagery-related attribute, and a condition-related attribute, as discussed above at least in the context of FIGS. 2A and 2B. In other particular of these embodiments the vehicular repair order can relate to repair of an automobile, as discussed above at least in the context of FIGS. 2A-6B.

In other embodiments, receiving the information associated with the repair order can include receiving the information associated with the repair order via a user interface of the computing device, where the user interface is configured to accept one or more selections associated with the one or more repair attributes, as discussed above at least in the context of FIGS. 3A-4D.

At block 920, the computing device can determine a first ontology related to the first repair attribute, where the first ontology is further related to a first template, as discussed above at least in the context of FIGS. 2C and 2D.

In some embodiments, determining the first ontology can include determining the first template based on the one or more selections of the one or more repair attributes, as discussed above at least in the context of FIGS. 2C and 2D.

In other embodiments, the first repair attribute can be associated with a first taxonomy of attributes. Then, determining the first ontology related to the first repair attribute can include: determining a first attribute group in the first taxonomy of attributes associated with the first repair attribute; and determining the first template based on the first repair attribute and the first attribute group, as discussed above at least in the context of FIGS. 2C and 2D. In particular of these embodiments, the first template includes the first repair attribute, as discussed above at least in the context of FIGS. 2C and 2D.

At block 930, the computing device can determine modified repair-related information by at least utilizing the first template to modify at least a first portion of the repair-related information including the information about the first repair attribute, as discussed above at least in the context of FIGS. 3A-6B.

In some embodiments, the information about the first repair attribute can include one or more words associated with the first repair attribute. Then, determining the modified repair-related information can include: determining one or more preferred repair-related words associated with the one or more words associated with the first repair attribute using the first ontology; and replacing the one or more words associated with the first repair attribute with the one or more preferred repair-related words in the first portion, as discussed above at least in the context of FIGS. 3A-4D. In other embodiments, determining the modified repair-related information can include: determining one or more partial repair-related words in the first portion; determining one or more complete repair-related words associated with the one or more partial repair-related words using the first ontology; and generating a display of the one or more complete repair-related words, as discussed above at least in the context of FIGS. 3A-4D. In particular of these embodiments, determining the modified repair-related information can further include: receiving a selection of a particular complete repair-related word from among the displayed one or more complete repair-related words; and replacing at least one partial repair-related words of the one or more repair-related words with the particular complete repair-related word, as discussed above at least in the context of FIGS. 3A-4D.

In still other embodiments, determining the modified repair-related information can include: determining a first ordering of repair attributes in the repair-related information; determining a second ordering of repair attributes in the first template, where the first ordering differs from the second ordering; and modifying the repair-related information so that repair attributes in the repair-related information are ordered according to the second ordering, as discussed above at least in the context of FIGS. 2A-4D.

At block 940, the computing device can generate an output of the computing device related to the repair order including the modified repair-related information, as discussed above at least in the context of FIGS. 3A-6B.

In some embodiments, the repair order can be associated with a previously-generated repair order. Then, generating the output of the computing device related to the repair order can include generating an output including at least part of the previously-generated repair order and at least part of the repair order, as discussed above at least in the context of FIG. 6B.

Additional Example Embodiments

The following clauses are offered as further description of the disclosure.

Clause 1—A method for generating repair orders, comprising: receiving repair-related information associated with a repair order at a computing device, wherein the repair-related information comprises information about a first repair attribute of one or more repair attributes; determining a first ontology related to the first repair attribute using the computing device, wherein the first ontology is further related to a first template; determining modified repair-related information by at least utilizing the first template to modify at least a first portion of the repair-related information comprising the information about the first repair attribute using the computing device; and generating an output of the computing device related to the repair order comprising the modified repair-related information.

Clause 2—The method of Clause 1 wherein the repair order comprises a vehicular repair order, wherein the one or more repair attributes comprise one or more vehicular-repair attributes, and wherein the first repair attribute comprises a first vehicular-repair attribute of the one or more vehicular-repair attribute.

Clause 3—The method of Clause 2, wherein the one or more vehicular-repair attributes comprise at least one of: a symptom-related attribute, an occurrence-related attribute, a spatially-related attribute, a system-related attribute, a speed-related attribute, a description-related attribute, an audio-related attribute, an imagery-related attribute, and a condition-related attribute.

Clause 4—The method of Clause 2 or Clause 3, wherein the vehicular repair order relates to repair of an automobile.

Clause 5—The method of any one of Clauses 1-4, wherein receiving repair-related information associated with the repair order comprises receiving the information associated with the repair order via a user interface of the computing device, and wherein the user interface is configured to accept one or more selections associated with the one or more repair attributes.

Clause 6—The method of Clause 5, wherein determining the first ontology comprises determining the first template based on the one or more selections of the one or more repair attributes.

Clause 7—The method of any one of Clauses 1-6, wherein the information about the first repair attribute comprises one or more words associated with the first repair attribute, and wherein determining the modified repair-related information comprises: determining one or more preferred repair-related words associated with the one or more words associated with the first repair attribute using the first ontology; and replacing the one or more words associated with the first repair attribute with the one or more preferred repair-related words in the first portion.

Clause 8—The method of any one of Clauses 1-7, wherein determining the modified repair-related information comprises: determining one or more partial repair-related words in the first portion; determining one or more complete repair-related words associated with the one or more partial repair-related words using the first ontology; and generating a display of the one or more complete repair-related words.

Clause 9—The method of Clause 8, wherein determining the modified repair-related information further comprises: receiving a selection of a particular complete repair-related word from among the displayed one or more complete repair-related words; and replacing at least one partial repair-related word of the one or more repair-related words with the particular complete repair-related word.

Clause 10—The method of any one of Clauses 1-9, wherein determining the modified repair-related information comprises: determining a first ordering of the repair attributes in the repair-related information; determining a second ordering of the repair attributes in the first template, wherein the first ordering differs from the second ordering; and modifying the repair-related information so that repair attributes in the repair-related information are ordered according to the second ordering.

Clause 11—The method of any one of Clauses 1-10, wherein the repair order is associated with a previously-generated repair order, and wherein generating the output of the computing device related to the repair order comprises generating an output comprising at least part of the previously-generated repair order and at least part of the repair order.

Clause 12—The method of any one of Clauses 1-11, wherein the first repair attribute is associated with a first taxonomy of attributes, and wherein determining the first ontology related to the first repair attribute comprises: determining a first attribute group in the first taxonomy of attributes associated with the first repair attribute; and determining the first template based on the first repair attribute and the first attribute group.

Clause 13—The method of Clause 12, wherein the first template comprises the first repair attribute.

Clause 14—A computing device, comprising: one or more processors; and a non-transitory computer-readable medium configured to store at least computer-readable instructions that, when executed by the one or more processors, cause the computing device to perform functions of the method of any one of Clauses 1-13.

Clause 15—A non-transitory computer readable medium, configured to store at least computer-readable instructions that, when executed by one or more processors of a computing device, cause the computing device to perform functions of the method of any one of Clauses 1-13.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

The above description provides specific details for a thorough understanding of, and enabling description for, embodiments of the disclosure. However, one skilled in the art will understand that the disclosure may be practiced without these details. In other instances, well-known structures and functions have not been shown or described in detail to avoid unnecessarily obscuring the description of the embodiments of the disclosure. The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure may be modified, if necessary, to employ the systems, functions and concepts of the above references and application to provide yet further embodiments of the disclosure. These and other changes may be made to the disclosure in light of the detailed description.

Specific elements of any of the foregoing embodiments may be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that may be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

One or more example embodiments refer to a vehicle. A vehicle is a mobile machine that can be used to transport a person, people, or cargo. Any vehicle described herein can be driven or otherwise guided along a path (e.g., a paved road or otherwise) on land, in water, or in the air or outer space. Any vehicle described herein can be wheeled, tracked, railed or skied. Any vehicle described herein can include an automobile, a motorcycle, an all-terrain vehicle (ATV) defined by ANSFSVIA-1-2007, a snowmobile, a personal watercraft (e.g., a JET SKI® personal watercraft), a light-duty truck, a medium-duty truck, a heavy-duty truck, a semi-tractor, or a farm machine. Any vehicle described herein can include or use any appropriate voltage or current source, such as a battery, an alternator, a fuel cell, and the like, providing any appropriate current or voltage, such as about 12 volts, about 42 volts, and the like. Any vehicle described herein can include or use any desired system or engine to provide its mobility. Those systems or engines can include vehicle components that use fossil fuels, such as gasoline, natural gas, propane, and the like, electricity, such as that generated by a battery, magneto, fuel cell, solar cell and the like, wind and hybrids or combinations thereof. Any vehicle described herein can include an ECU, a data link connector (DLC), and a vehicle communication link that connects the DLC to the ECU.

Moreover, a block that represents one or more information transmissions may correspond to information transmissions between software and/or hardware modules in the same physical device. However, other information transmissions may be between software modules and/or hardware modules in different physical devices.

Numerous modifications and variations of the present disclosure are possible in light of the above teachings.

The invention claimed is:

1. A method, comprising:
   receiving, at a user interface of a computing device, repair-related information associated with a repair order to repair a complaint about a vehicle, wherein the repair-related information comprises information about a first repair attribute of one or more repair attributes, and wherein the first repair attribute is associated with a first taxonomy of attributes;
   determining a first ontology related to the first repair attribute and a first template using the computing device for:
   determining a first attribute group in the first taxonomy of attributes associated with the first repair attribute,
   determining the first template based on the first repair attribute and the first attribute group, wherein the first ontology and/or the first taxonomy include one or more preferred terms that fit a canonical representation of terms;
   determining modified repair-related information using the user interface of the computing device by at least:
   determining that the repair-related information comprises a non-preferred term using the first ontology and/or first taxonomy,
   providing one or more preferred-term selections using the user interface, wherein the one or more preferred-term selections are associated with the one or more preferred terms that fit the canonical representation of terms,
   receiving a particular preferred-term selection of the one or more preferred-term selections using the user interface, the particular preferred-term selection associated with a particular preferred term of the one or more preferred terms that fit the canonical representation of terms,
utilizing the first template to modify at least a first portion of the repair-related information comprising the information about the first repair attribute to fit the canonical representation of terms by replacing the non-preferred term in the repair-related information with the particular preferred term using the computing device, and
displaying the modified repair-related information using the user interface; and
generating an output of the computing device related to the repair order, the output comprising the modified repair-related information.

2. The method of claim 1, wherein the one or more repair attributes comprise one or more vehicular-repair attributes, and wherein the first repair attribute comprises a first vehicular-repair attribute of the one or more vehicular-repair attributes.

3. The method of claim 2, wherein the one or more vehicular-repair attributes comprise at least one of: a symptom-related attribute, an occurrence-related attribute, a spatially-related attribute, a system-related attribute, a speed-related attribute, a description-related attribute, an audio-related attribute, an imagery-related attribute, and a condition-related attribute.

4. The method of claim 1, wherein the repair order relates to repair of an automobile.

5. The method of claim 1, wherein the first repair attribute relate to an image, and wherein generating the output related to the repair order comprises generating an output related to the repair order that further comprises the image.

6. The method of claim 5, wherein determining the first ontology comprises determining the first template based on the one or more selections of the one or more repair attributes.

7. The method of claim 1, wherein
receiving the particular preferred-term selection comprises receiving multiple preferred-term selections that include the particular preferred-term selection; and
wherein replacing the non-preferred term in the repair-related information with the particular preferred term comprises replacing the non-preferred term and one or more other non-preferred terms in the repair-related information based on the multiple preferred-term selections.

8. The method of claim 1, wherein determining the modified repair-related information comprises:
determining one or more partial repair-related words in the first portion;
determining one or more complete repair-related words associated with the one or more partial repair-related words using the first ontology; and
generating a display of the one or more complete repair-related words.

9. The method of claim 8, wherein determining the modified repair-related information further comprises:
receiving a selection of a particular complete repair-related word from among the displayed one or more complete repair-related words; and
replacing at least one partial repair-related word of the one or more repair-related words with the particular complete repair-related word.

10. The method of claim 1, wherein determining the modified repair-related information comprises:
determining a first ordering of repair attributes in the repair-related information;
determining a second ordering of the repair attributes in the first template, wherein the first ordering differs from the second ordering; and
modifying the repair-related information so that repair attributes in the repair-related information are ordered according to the second ordering.

11. The method of claim 1, wherein the first repair attribute is associated with a first taxonomy of attributes that comprises one or more of: a vehicle information taxonomy, a parts and labor taxonomy, a diagnosis taxonomy, a commonly replaced parts taxonomy, and an additional replaced parts taxonomy.

12. The method of claim 1, wherein the
repair order is associated with a previously-generated repair order, and wherein generating the output of the computing device related to the repair order comprises generating an output that further comprises at least part of the repair order and at least part of the previously-generated repair order.

13. The method of claim 1, wherein the first template comprises the first repair attribute.

14. The method of claim 1, further comprising:
repairing the vehicle based on the generated output of the computing device.

15. The method of claim 1, further comprising:
generating a diagnosis of the vehicle for repairing the complaint about the vehicle, the diagnosis based on the first ontology and the first taxonomy; and wherein
generating the output related to the repair order comprises generating an output related to the repair order that further comprises the diagnosis of the vehicle.

16. A computing device, comprising:
a user interface;
one or more processors; and
a non-transitory computer-readable medium configured to store at least computer-readable instructions that, when executed by the one or more processors, cause the computing device to perform functions comprising:
receiving, at the user interface, repair-related information associated with a repair order to repair a complaint about a vehicle, wherein the repair-related information comprises information about a first repair attribute of one or more repair attributes, and wherein the first repair attribute is associated with a first taxonomy of attributes;
determining a first ontology related to the first repair attribute and a first template by at least:
determining a first attribute group in the first taxonomy of attributes associated with the first repair attribute, and
determining the first template based on the first repair attribute and the first attribute group, wherein the first ontology and/or the first taxonomy include one or more preferred terms that fit a canonical representation of terms;
determining modified repair-related information using the user interface by at least:
determining that the repair-related information comprises a non-preferred term using the first ontology and/or first taxonomy,
providing one or more preferred-term selections using the user interface, wherein the one or more preferred-term selections are associated with the one or more preferred terms that fit the canonical representation of terms, receiving a particular preferred-term selection of the one or more preferred-term selections using the user interface, the particular preferred-term selection associated with a particular preferred term of the one or more preferred terms that fit the canonical representation of terms, utilizing the first template to modify at least a first portion of the repair-related information comprising the information about the first repair attribute to fit the canonical representation of terms by replacing the non-preferred term in the repair-related information with the particular preferred term, and displaying the modified repair-related information using the user interface; and generating an output related to the repair order, the output comprising the modified repair-related information.

17. The computing device of claim 16, wherein the one or more repair attributes comprise one or more vehicular-repair attributes, and wherein the first repair attribute comprises a first vehicular-repair attribute of the one or more vehicular-repair attributes.

18. The computing device of claim 17, wherein the one or more vehicular-repair attributes comprise at least one of: a symptom-related attribute, an occurrence-related attribute, a spatially-related attribute, a system-related attribute, a speed-related attribute, a description-related attribute, an audio-related attribute, an imagery-related attribute, and a condition-related attribute.

19. The computing device of claim 16, wherein the first repair attribute relate to an image, and wherein generating the output related to the repair order comprises generating an output related to the repair order that further comprises the image.

20. The computing device of claim 16, wherein the information about the first repair attribute comprises one or more words associated with the first repair attribute, and wherein determining the modified repair-related information comprises:

determining a particular preferred term of the one or more preferred terms that is associated with the one or more words associated with the first repair attribute using the first ontology; and replacing the one or more words associated with the first repair attribute with the particular preferred term in the first portion.

21. The computing device of claim 16, wherein determining the modified repair-related information further comprises:

determining one or more partial repair-related words in the first portion;

determining one or more complete repair-related words associated with the one or more partial repair-related words using the first ontology; and generating a display of the one or more complete repair-related words.

22. A non-transitory computer readable medium, configured to store at least computer-readable instructions that, when executed by one or more processors of a computing device, cause the computing device to perform functions comprising:

receiving, at a user interface of the computing device, repair-related information associated with a repair order to repair a complaint about a vehicle, wherein the repair-related information comprises information about a first repair attribute of one or more repair attributes, and wherein the first repair attribute is associated with a first taxonomy of attributes;

determining a first ontology related to the first repair attribute and a first template by at least:

determining a first attribute group in the first taxonomy of attributes associated with the first repair attribute, and determining the first template based on the first repair attribute and the first attribute group, wherein the first ontology and/or the first taxonomy include one or more preferred terms that fit a canonical representation of terms;

determining modified repair-related information using the user interface of the computing device by at least:

determining that the repair-related information comprises a non-preferred term using the first ontology and/or first taxonomy, providing one or more preferred-term selections using the user interface, wherein the one or more preferred-term selections are associated with the one or more preferred terms that fit the canonical representation of terms, receiving a particular preferred-term selection of the one or more preferred-term selections using the user interface, the particular preferred-term selection associated with a particular preferred term of the one or more preferred terms that fit the canonical representation of terms, utilizing the first template to modify at least a first portion of the repair-related information comprising the information about the first repair attribute to fit the canonical representation of terms by replacing the non-preferred term in the repair-related information with the particular preferred term, and displaying the modified repair-related information using the user interface; and generating an output related to the repair order, the output comprising the modified repair-related information.

* * * * *